(12) United States Patent
Jones et al.

(10) Patent No.: US 6,937,349 B2
(45) Date of Patent: Aug. 30, 2005

(54) SYSTEMS AND METHODS FOR ABSOLUTE POSITIONING USING REPEATED QUASI-RANDOM PATTERN

(75) Inventors: Benjamin K. Jones, Seattle, WA (US); Michael Nahum, Kirkland, WA (US)

(73) Assignee: Mitutoyo Corporation, Kawasaki (JP)

( * ) Notice: Subject to any disclaimer, the term of this patent is extended or adjusted under 35 U.S.C. 154(b) by 294 days.

(21) Appl. No.: 10/427,921

(22) Filed: May 2, 2003

(65) Prior Publication Data

US 2004/0218181 A1 Nov. 4, 2004

(51) Int. Cl.[7] .............................. G01B 11/14; G01D 5/34
(52) U.S. Cl. .................. 356/617; 356/614; 250/231.13; 382/278
(58) Field of Search ........................ 356/401, 614–617; 250/231.13, 231.14, 231.16; 382/278, 295; 345/428

(56) References Cited

U.S. PATENT DOCUMENTS

| | | | |
|---|---|---|---|
| 4,967,093 A | * 10/1990 | Takemori | ................. 250/559.2 |
| 5,104,225 A | 4/1992 | Masreliez | |
| 5,198,869 A | * 3/1993 | Monteverde et al. | .... 356/243.4 |
| 6,642,506 B1 | * 11/2003 | Nahum et al. | ......... 250/231.13 |
| 6,677,948 B1 | * 1/2004 | Wasserman et al. | ........ 345/428 |
| 6,781,694 B2 | * 8/2004 | Nahum et al. | .............. 356/420 |
| 6,873,422 B2 | * 3/2005 | Nahum et al. | .............. 356/614 |

FOREIGN PATENT DOCUMENTS

| | | |
|---|---|---|
| EP | 1 099 936 A1 | 5/2001 |
| EP | 1 382 940 A2 | 1/2004 |

* cited by examiner

Primary Examiner—Layla Lauchman
(74) Attorney, Agent, or Firm—Oliff & Berridge, PLC

(57) ABSTRACT

An absolute 2D position-sensing device is usable to measure the position of a first element with respect to a second element. A 2D absolute scale includes an integrated 2D absolute scale pattern extending over the 2D scale area along each measuring axis of the scale. The integrated 2D absolute scale pattern includes a predetermined quasi-random pattern repeatedly interleaved with a plurality of code portions along each axis. Each code portion includes a plurality of code elements indicative of an absolute measurement value. The offset of the quasi-random pattern relative to a readhead of the device is combined with the absolute measurement value to determine an absolute position to a very high resolution over a relatively large 2D range.

27 Claims, 15 Drawing Sheets

SYSTEMS AND METHODS FOR ABSOLUTE POSITIONING USING REPEATED QUASI-RANDOM PATTERN

BACKGROUND OF THE INVENTION

1. Field of Invention

This invention relates to an absolute position optical displacement-sensing device that senses absolute positions in two dimensions.

2. Description of Related Art

Absolute position encoders use a scale structure that allows the position of a readhead relative to a scale to be determined without requiring any reference to a given starting point along the scale. A variety of 1-dimensional (1D) absolute position encoders are known that use multiple information patterns extending in parallel along a 1-dimensional scale. Also, 1D and 2-dimensional (2D) codes have been used to identify positions along 1D scales. However, the structures of such absolute position encoders that are fundamentally 1-dimensional are generally not adaptable or combinable to provide a high resolution and high accuracy absolute position measurement at an arbitrary position in a two-dimensional plane.

A two-dimensional (2D) incremental (non-absolute) position encoder providing high resolution and high accuracy at an arbitrary position in a 2D plane is disclosed in U.S. Pat. No. 5,104,225 to Masreliez. However, the grating scale and readhead disclosed in the 225 patent are not adaptable to provide absolute position measurement.

Numerous 2D bar code systems are known. However, the "information storage" structures of such 2D bar code systems are generally not well suited to act as a 2D scale for high-resolution absolute position determinations. Furthermore, it is not clear how to array such codes into a continuous 2D scale and reliably discriminate between adjacent codes.

SUMMARY OF THE INVENTION

A 2D absolute scale pattern for a position measuring system is a two-dimensional pattern carried on a two-dimensional surface of a scale member. The inventors have determined that 1D absolute position measurement systems and 2D grating incremental measurement systems are generally difficult, costly, or impossible to adapt for use as high-resolution 2D absolute measurement systems. Furthermore, the patterns of various 2D bar code configurations are generally not well suited to act as patterns for 2D scales for high-resolution absolute position determination.

When such bar code patterns are arrayed adjacent to each other in a 2D pattern to form a continuous 2D scale, discrimination between the various individual patterns adds further signal processing complexity and further increases the difficulty of determining the position of such patterns with both high resolution and high speed. Moreover, generating such patterns over an extended two-dimensional area that are unique within that area while at the same time aligning these patterns with high precision in order to provide an accurate and high-resolution absolute measurement scale is technically difficult and/or costly.

Attempting to circumvent the foregoing problems by reducing the spatial resolution and/or the distribution of such patterns will generally degrade the ability to determine the positions of these patterns with high resolution, which generally depends on the spatial frequencies or "information density", that is, the "density of transitions", present in a position measurement scale. Alternatively, attempting to circumvent the foregoing problems by reducing the complexity of the patterns will general reduce the amount of area that can be everywhere uniquely identified. That is, the potential range of the 2D absolute scale will be reduced.

An optical absolute position encoder that could avoid any one or more of these disadvantages would be useful. It should be appreciated that, in general, it is the particular arrangement of a 2D absolute scale pattern that provides a 2D absolute position measuring system that provides high speed position measurement over a long range with high resolution and accuracy and at a reasonable cost.

This invention provides 2D optical absolute position encoders that have relatively small readhead sizes.

This invention separately provides a 2D scale, usable with optical absolute position encoders, that has an integrated scale that includes both code portions and quasi-random pattern portions.

This invention further provides 2D optical absolute position encoders having a 2D scale pattern that integrates both quasi-random pattern portions and code portions in advantageous proportions.

This invention separately provides 2D optical absolute position encoders that have both long scale lengths along each of the two dimensions and high resolution.

This invention further provides 2D optical absolute position encoders that obtain long scale lengths and high resolution by using a 2D integrated scale that includes code portions that allow for long scale lengths along each of the two dimensions and a quasi-random pattern portions that allow for high-resolution determinations of the position between the readhead and the scale.

This invention further provides a 2D integrated scale where the code portions and the quasi-random pattern portions occur alternately along each of the two dimensions of the 2D scale.

This invention additionally provides a 2D scale where the code portions and the quasi-random pattern portions that occur alternately along each of the two dimensions of the scale are adjacent to one another in both of the two dimensions.

This invention separately provides systems and methods for determining the absolute position of a readhead of an optical absolute position encoder in two dimensions relative to a 2D scale of the optical absolute position encoder from an image of a 2D integrated scale that includes both code portions and quasi-random pattern portions.

This invention further provides systems and methods for determining the absolute position of the readhead relative to the 2D scale along each dimension by locating a code portion appearing within a 2D image of the 2D scale and determining a first-resolution 2D position along each dimension based on the code appearing in the located code portion.

This invention separately provides systems and methods for determining the absolute position of the readhead relative to the 2D scale along each dimension by locating a predetermined portion appearing within the 2D image of the 2D scale and determining a second-resolution position along each dimension based on the 2D location of the predetermined portion within the 2D image of the 2D scale.

This invention separately provides systems and methods for determining the absolute position of the readhead relative to the 2D scale along each dimension by determining an offset distance along each dimension between a quasi-random pattern appearing within a quasi-random pattern portion and a reference structure that is comparable to the quasi-random pattern and determining a third-resolution position along each dimension based on the determined offset distances.

In various exemplary embodiments of the scale according to this invention, the scale includes a 2D integrated scale pattern that extends in two dimensions. The integrated pattern includes a plurality of quasi-random pattern portions that extend in each of the two dimensions. The integrated scale pattern also includes code portions, which are distributed in two dimensions within and/or between the quasi-random pattern portions. Each code portion includes a unique set or group of code elements and thus identifies a specific 2D location within the scale. That is, each unique set or group of code elements defines a first location along a first one of the two dimensions and a second location along a second one of the two dimensions.

In various exemplary embodiments, each code portion includes a predetermined portion that has an extent along each of the two dimensions. In each dimension, the predetermined portion may be a single element or space having predetermined characteristics, or may be a predetermined pattern of elements. This predetermined portion allows the readhead signals arising from the code portions of the scale to be rapidly located and/or distinguished from the readhead signals arising from other portions of the scale.

In various exemplary embodiments, each quasi-random pattern portion contains a quasi-random pattern, similar to a speckle pattern or the like, that includes nominally random features that are randomly distributed, and that has extents along each of the two dimensions. In various exemplary embodiments according to this invention, the quasi-random pattern is substantially identical, that is, repeated, in each quasi-random pattern portion. The quasi-random pattern is usable in determining an offset position between the readhead and the 2D scale.

In various exemplary embodiments according to this invention, for at least one of the two dimensions, one set of the code elements may be spaced apart along that dimension from an adjacent set of code elements up to a determined limit based on the extent of a detector array of the readhead along that dimension and a magnification along that dimension applied to the scale image by the readhead.

In various exemplary embodiments, each set of code elements in effect indicates the position or measurement value along each dimension of a local datum feature to provide a coarsely-spaced 2D absolute position value. In various exemplary embodiments according to this invention, a detector array of the readhead further determines the position along each of the two dimensions of the local datum feature relative to the detector array to a higher resolution.

In various exemplary embodiments of the 2D absolute scale according to this invention, the sets of code elements form a 2D sequence of code words extending across the 2D scale. In various exemplary embodiments according to this invention, the sequence of code words directly indicates the corresponding 2D position within the scale. In various other exemplary embodiments according to this invention, the code words are converted to absolute position measurement values along each of the two dimensions using a look-up table or other decoding device or technique.

These and other features and advantages of this invention are described in, or are apparent from, the following detailed description of various exemplary embodiments of the systems and methods according to this invention.

BRIEF DESCRIPTION OF THE DRAWINGS

Various exemplary embodiments of the systems and methods of this invention will be described in detail, with reference to the following figures, wherein.

DETAILED DESCRIPTION OF EXEMPLARY EMBODIMENTS

Figure 1:
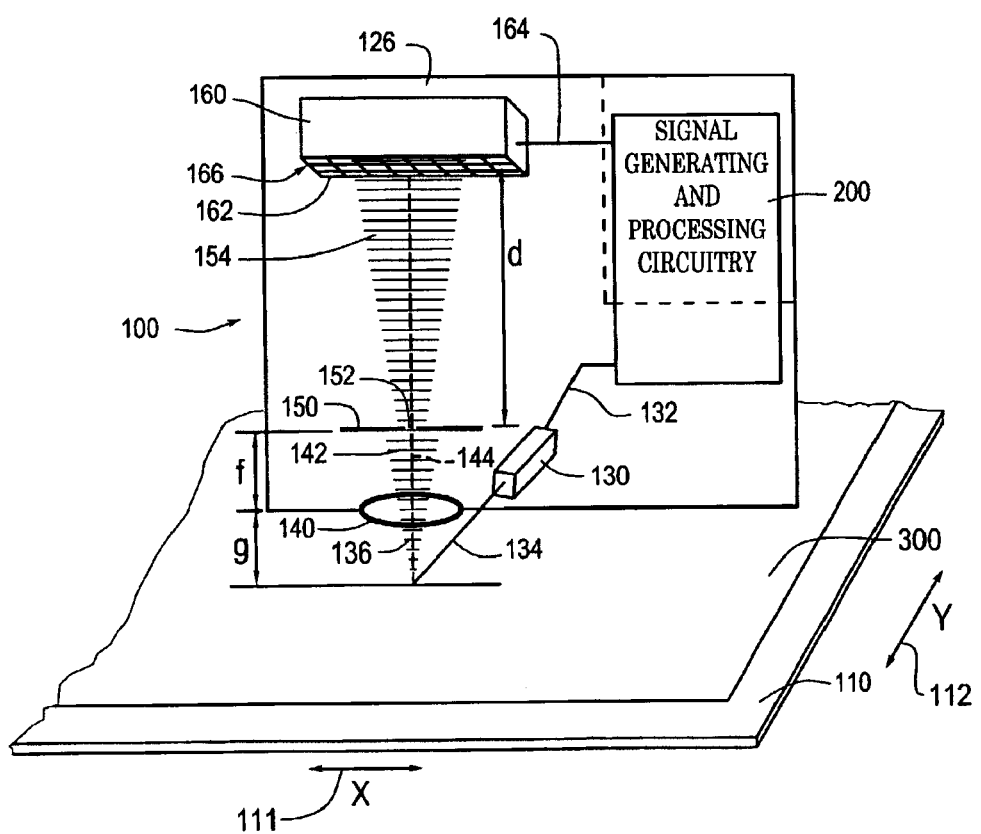
FIG. 1 is a block diagram of a 2D optical position transducer according to this invention.

FIG. 1 is a block diagram of a 2D optical absolute position encoder 100 usable with a 2D integrated scale pattern according to this invention to generate a 2D absolute position measurement. The 2D optical absolute position encoder 100 shown in FIG. 1 includes a readhead 126, signal generating and processing circuitry 200 and a 2D scale 110. The 2D scale 110 includes a 2D integrated scale pattern 300. In FIG. 1, the components of the readhead 126, and their relation to the 2D scale 110 and the 2D integrated scale pattern 300, are shown schematically in a layout that generally corresponds to an exemplary physical configuration, as further described below.

In particular, the scale 110 is positioned adjacent to an illuminating and receiving end of the readhead 126, such that when the 2D scale 110 is illuminated by light emitted from that end of the readhead 126 by a light source 130, the emitted light is selectively reflected back by the 2D integrated scale pattern 300 on the 2D scale 110 towards image receiving optical elements positioned at that end of the readhead 126. The 2D scale 110 is positioned at a generally stable distance from the light source 130 and an optical system housed in the readhead 126. The 2D scale 110 moves relative to readhead 126 along two axes of relative motion, such as along a first measuring axis 111 and a second measuring axis direction 112, as shown in FIG. 1.

The relative motion in a third dimension orthogonal to the first and second measuring axes 111 and 112 is generally constrained, such as, for example, by conventional guideways or bearings (not shown) mounted to a frame, to maintain the proper relative distance or gap between the readhead 126 and the scale 110. The readhead 126 may include an alignment feature (not shown) which aids in mounting the readhead 126, and aligns the internal components of the readhead 126 relative to the mounting frame and/or the expected axes of relative motion 111 and 112 of the 2D scale 110.

The 2D scale 110 should provide a relatively high contrast 2D image when illuminated with the wavelengths of light provided by the light source 130. In various exemplary embodiments, the 2D scale 110 is a generally relatively-reflective member having a diffusely reflecting surface on which a 2D pattern of relatively-unreflective scale elements is formed. In various exemplary embodiments, the pattern of relatively-unreflective scale elements defines a quasi-random pattern, which may resemble a speckle pattern. It should be appreciated that the relatively high reflectivity of the 2D scale 110 can be obtained by any known or later-developed material and/or structure. For example, the 2D scale 110 can have an appropriate diffusely reflecting surface texture and be made of a relatively reflective material, such as a metal or glass, or a polymer such as Mylar, or the like. The relatively unreflective scale elements can be formed by coating the surface of the 2D scale 110, by differentially processing the surface of the 2D scale 110 to decrease the reflectivity of the material used to form the 2D scale 110, by selectively depositing a relatively non-reflective material on the surface of the 2D scale 110 or the like.

In various other exemplary embodiments, the 2D scale 110 is made of a relatively non-reflective material, while the 2D scale elements are made of a relatively reflective material having an appropriate diffusely reflecting surface texture. It should be appreciated that, in this case, the 2D scale 110 can be rendered relatively non-reflective based on the materials it is formed from, by coating or otherwise treating the surface of the 2D scale 110, or using any other known or later-developed process for selectively decreasing and/or increasing the reflectivity in the appropriate locations along the 2D scale 110.

It should be appreciated that in various embodiments, the 2D scale 110 may have more or less specular surface portions. However, for such scales, the image contrast and/or intensity will exhibit more sensitivity to alignment variations and/or surface contamination on the scale, which may reduce the robustness and measurement accuracy of the 2D absolute measurement system 100. It should also be appreciated that, in various other exemplary embodiments, the 2D scale 110 and/or the surface elements formed on the 2D scale 110 may include colors that enhance the contrast between the 2D scale elements and the remainder of the 2D scale 110 in the image of the 2D scale 110 detected by the light detector 160.

As shown in FIG. 1, the image receiving optical elements of the readhead 126 include a lens 140 positioned at the illuminating and receiving end of the readhead assembly 106 such that an optical axis 144 of the lens 140 is generally aligned with the illuminated area of the 2D scale 110. In the exemplary embodiment shown in FIG. 1, the readhead 126 further includes a pinhole aperture plate 150, spaced apart from the lens 140 along the optical axis 144 by a distance coinciding with the focal length f of the lens 140, and a light detector 160 spaced apart from the aperture plate 150 along the optical axis 144, as shown in FIG. 1. Such a telecentric arrangement makes the magnification of the image of the 2D integrated scale pattern 300 on the light detector 160 approximately independent of the object distance g from the lens 140 to the 2D integrated scale pattern 300. In various embodiments, if the object distance g is sufficiently well controlled, such as, for example, by accurate bearings or the like, the aperture plate 150 may be omitted.

The light detector 160 can be any known or later-developed type of light sensitive material or device that can be organized into a 2D array of independent and individual light sensing elements, such as a camera, an electronic or digital camera, a CCD array, an array of CMOS light sensitive elements, or the like. An exemplary spacing and positioning of the 2D scale 110 and the readhead 126, including the lens 140, the aperture plate 150, and the light detector 160, is further described below.

The mounting of the light source 130, the lens 140, the aperture plate 150, and the light detector 160 in the housing of the readhead 126 may be done according to conventional methods of miniature optical system construction and/or industrial camera construction, provided that the components are mounted in a relatively precise and stable manner. When the readhead 126 is suitably positioned adjacent to the scale 110, each image captured by the light detector 160 will contain a 2D portion of the 2D integrated scale pattern 300.

The light detector 160 has a 2D array 166 of image elements 162 spaced apart along two directions corresponding, respectively, to each of the two measuring axes 111 and 112 at a known spacing. This known spacing may be the same for the two directions corresponding to the two measuring axes 111 and 112, or may be different for each of the two directions. The known spacing along each of the two directions corresponding, respectively, to the measuring axis 111 and 112 provides the basis for measuring the displacement or offset along that measuring axis 111 or 112 between an image projected onto the light detector 160 and a reference image generically corresponding to an obtained image. The known spacing in the direction along each measuring axis 111 and 112 thus also provides the basis for measuring along each measuring axis 111 and 112 the displacement of the images of the 2D integrated scale pattern 300 to resolution as fine or finer than the known spacing along that measuring axis 111 or 112. In the following discussion, for convenience, the measuring axis 111 may also be referred to as the X-axis, and the measuring axis 112 may also be referred to as the Y-axis. It will be appreciated that the X and Y axes are defined with respect to the scale alignment and each other, and are not intended to imply any particular orientation of the 2D optical absolute position encoder 100 in space.

It should be appreciated that, in various exemplary embodiments, the image elements 162 of the light 160 detector are arranged in orthogonal rows and columns and the rows are aligned with a direction corresponding to one of the measuring axes in the obtained images, and the columns are aligned with a direction corresponding to the other one of the measuring axes in the obtained images. However, more generally, it should be appreciated that in various other embodiments, the image elements 162 of the light 160 detector are not arranged in orthogonal rows and columns that are aligned with the measuring axes in the obtained images, provided that a known spacing of the image elements 162 along each of the two directions, corresponding, respectively, to the measuring axes 111 and 112, can still be determined. In such a case, the known spacing along a direction corresponding to a respective measuring axis still provides the basis for measuring the displacement or offset along that measuring axis between two similar images projected onto the light detector 160 or an image projected onto the light detector 160 and a synthetic image generically corresponding to an obtained image.

In addition, in various exemplary embodiments, the readhead 126 includes at least a portion of the signal generating and processing circuitry 200. As shown in FIG. 1, a signal line 132 from the signal generating and processing circuitry 200 is connected to the light source 130, to control and/or drive the light source 130. A signal line 164 connects the light detector 160 and the signal generating and processing circuitry 200. In particular, each of the image elements 162 of the array 166 can be individually addressed to output a value representing the light intensity on that image element 162 over the signal line 164 to the signal generating and processing circuitry 200. Additional portions of the signal generating and processing circuitry 200 may be placed remotely from the readhead 126, and the functions of the readhead 126 can be operated and displayed remotely. The signal generating and processing circuitry 200 is described in greater detail below with respect to FIG. 17.

As shown in FIG. 1, a light beam 134 is emitted by the light source 130 and is directed onto the 2D integrated scale pattern 300 carried by the 2D scale 110 to illuminate a portion of the 2D integrated scale pattern 300. As a result, the illuminated portion of the 2D integrated scale pattern 300 selectively reflects light 136 about the optical axis 144 depending on the elements of the 2D integrated scale pattern 300 that occur in the illuminated portion of the 2D integrated scale pattern 300.

When the illumination angle of the light beam 134 is oblique, the angle between the incident light beam 134 and the optical axis 144 may be such that relatively specular surfaces on the 2D scale 110 will reflect the light incident on the relatively specular surfaces away from the field detected by the readhead 126. In that case, in various exemplary embodiments, it is useful if the portions of the 2D scale 110 that are intended to provide relatively higher intensity in the detected image are made relatively diffuse, to provide relatively diffuse surface portions that receive illumination. In various exemplary embodiments, the diffuse surface portions may be relatively diffuse due to their surface finish or material characteristics, or they may be made relatively diffuse by the application of diffuse coatings or surfacing texturing, or the like. These diffuse surface portions, due to their diffuse nature, redirect at least some of the obliquely-received light along the optical axis 144. In this case, the diffuse surface portions will tend to be brighter and/or provide higher image contrast than they would in the absence of being made relatively diffuse.

In one exemplary embodiment, the diffuse surface portions are the scale elements. In some such exemplary embodiments, the areas surrounding the scale elements are specularly reflective. In other exemplary embodiments, the diffuse portions are located in the areas surrounding relatively darker and/or specularly-reflecting scale elements. In various exemplary embodiments, the 2D scale elements may generally be formed by a relatively thin layer of material on either a front or back surface of the 2D scale 110.

Figure 3:
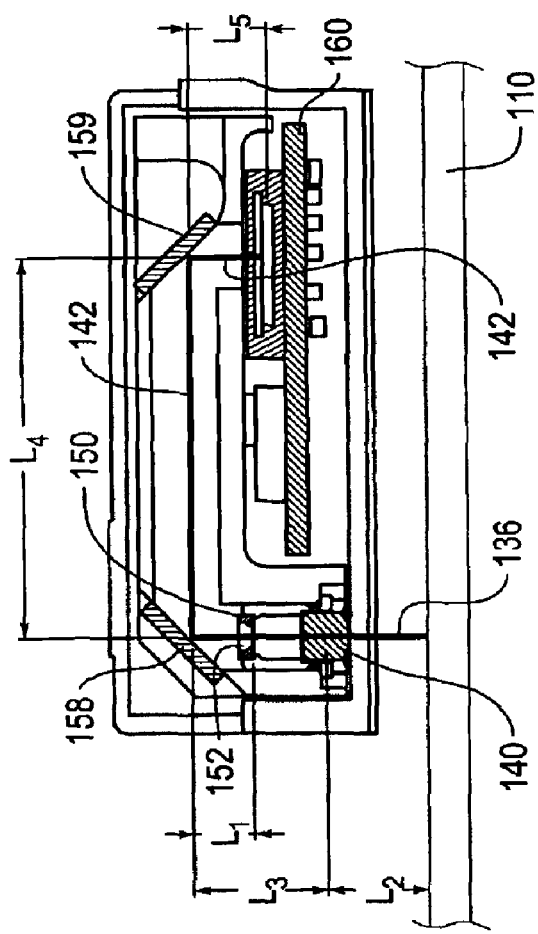
FIGS. 2 and 3 are end and side views, respectively, of one exemplary embodiment of the 2D optical position transducer shown in FIG. 1.
Figure 2:
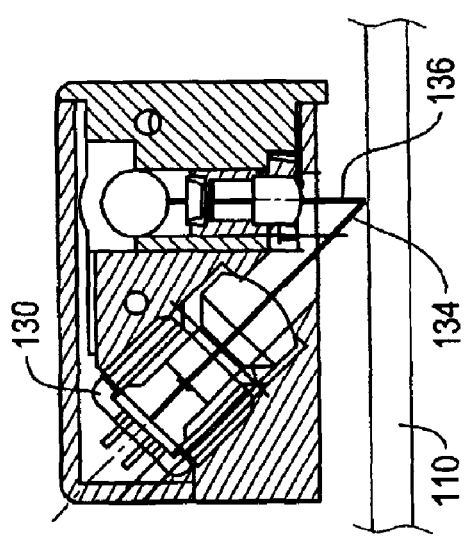

FIGS. 2 and 3 are end and side views, respectively, of one exemplary embodiment of the 2D optical position transducer shown in FIG. 1. As shown in FIGS. 2 and 3, in this exemplary embodiment, the light source 130 is a light emitting diode. A beam 134 from the light source 130 is reflected by the 2D scale 110. The reflected beam 136 passes through the lens 140 and is projected as light 142 to an aperture 152 in the pinhole aperture plate 150 to reach to a first mirror 158. The beam of light 142 is reflected by the first mirror 158 to a second mirror 159. The beam of light 142 is further reflected by the second mirror 159 onto the detector 160. It should be appreciated that only the central axes of the beam 134, the reflected beam 136 and the beam of light 142 are shown in FIGS. 2 and 3. In general the beam 134 and 136 will have a beam diameter larger than the aperture 152, so that the aperture 152 is the limiting aperture of the optical system.

In various exemplary embodiments, the beam 134 and the beam 136 are at a 45° angle relative to each other in a plane perpendicular to the 2D scale 110. The first and second mirrors 158 and 159 each change the direction of the beam 136 by 90°. In various exemplary embodiments, the distance L2 between the 2D scale 110 and the effective plane of the lens 140 is about 5.5 mm. The distance L3 between the lens 140 and the aperture 152 is about 4.5 mm. The distance L1 between the first mirror 158 and the aperture 152 is about 4.1 mm. The distance L4 between the first and the second mirrors 158 and 159 is about 23.7 mm. The distance L5 between the second mirror 159 and the detector 160 is about 5.3 mm.

Figure 4:
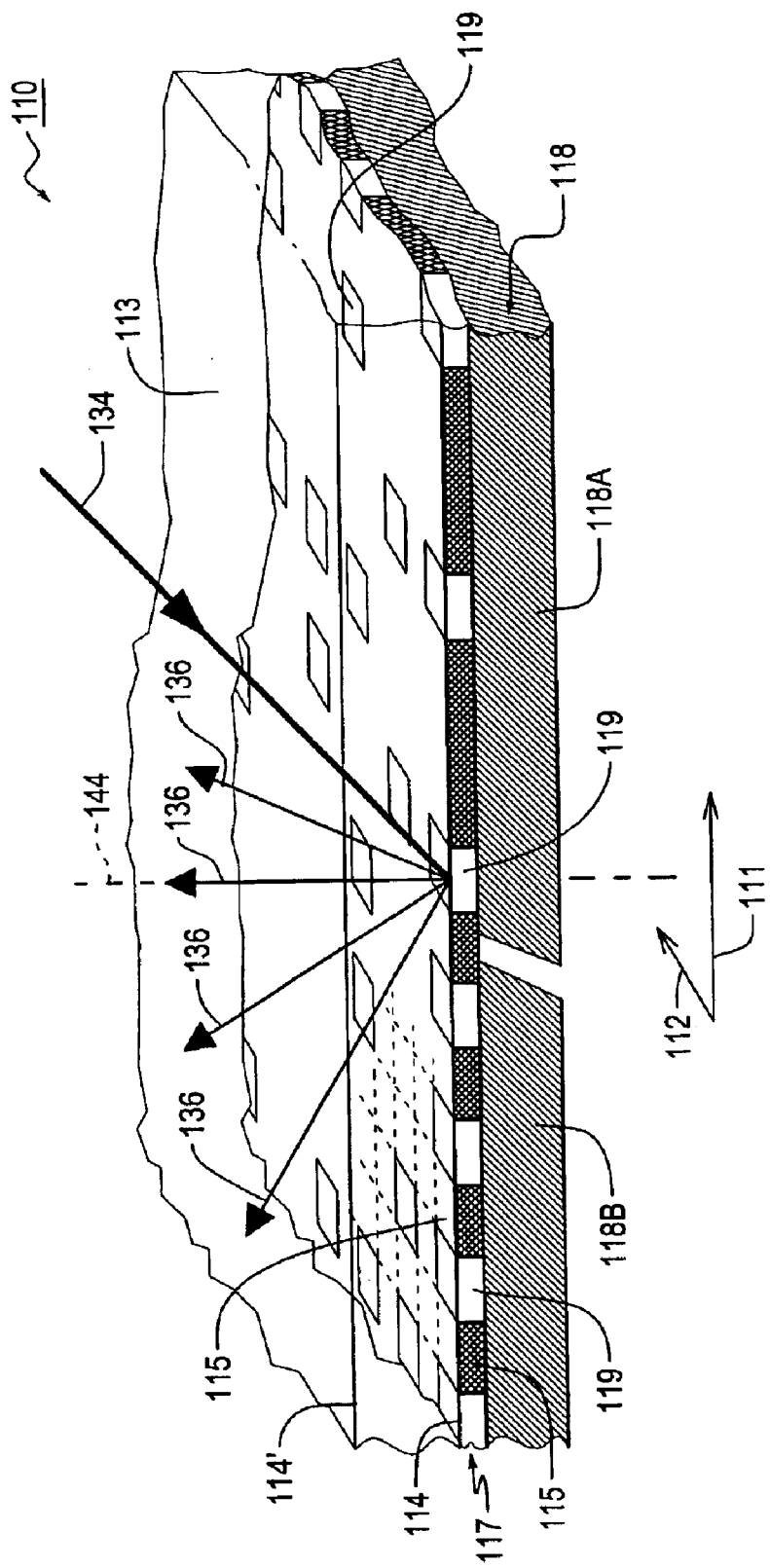
FIG. 4 is an isometric side view of one exemplary embodiment of a diffusely-reflecting scale according to this invention.

FIG. 4 shows an isometric side view of one exemplary embodiment of a portion of a 2D scale 110 that is usable when the angle between the incident light beams and optical axis is such that relatively specular scale surfaces will reflect the light incident on those relatively specular surfaces, that is, the reflected light 136, away from the path of the light detected by the readhead 126, that is, a path generally aligned with the optical axis 144.

As shown in FIG. 4, the scale features of the 2D scale 110 generally include the 2D scale darker pattern elements 115, indicated by the dashed outlines in FIG. 4, and the 2D scale lighter pattern elements 119. It should be appreciated that, in FIG. 4, the height or thickness of the 2D scale darker pattern elements 115 and the 2D scale lighter pattern elements 119 in the vertical direction is greatly exaggerated for the purpose of illustration.

In various exemplary embodiments, the 2D scale darker pattern elements 115 are part of a patterning material layer 117 that is a reflective thin film formed on a first surface 114 of a substrate 113 used to form the 2D scale 110. It should be understood that in the embodiment shown in FIG. 4, a limited number of exemplary 2D scale darker pattern elements 115 are indicated by dashed outlines for the purpose of explanation, while the remainder of the 2D scale darker pattern elements 115 are represented as a continuous field where the 2D scale darker pattern elements 115 are merged and/or indistinguishable. In general, the 2D scale darker pattern elements 115 are similar in extent to the 2D scale lighter pattern elements 119, and that size generally corresponds to a patterning resolution associated with the process used to fabricate the 2D scale 110. Thus, with reference to the configuration shown in FIG. 4, in various portions of the 2D scale 110, several of the 2D scale lighter pattern elements 119 could alternatively be shown with a higher placement density, to form scale features where they are merged and/or indistinguishable, while the 2D scale darker pattern elements 115 could alternatively be shown as relatively isolated elements in various portions of the 2D scale 110.

The 2D scale darker pattern elements 115 include a surface having generally consistent optical properties and extending along the first measuring axis 111 and along the second measuring axis 112. In various exemplary embodiments, the 2D scale darker pattern elements 115 and the 2D scale lighter pattern elements 119 provide different reflected intensities in readhead images that range anywhere in the spectrum between two extreme intensities (i.e., black and white), provided that the different reflected intensities can generally be discriminated to provide an operable scale according to the measurement principles described herein. In the embodiment shown in FIG. 4, the 2D scale 110 is oriented such that a second surface 114' of the substrate 113 of the 2D scale 110 is nearer to the source of the light beam 134. In this case, the substrate 113 should be transparent to at least one wavelength of the light beam 134. A diffuse backing 118 is formed or provided on, over or very near to the first surface 114, such that the diffuse backing 118 provides a diffusely reflecting surface in the area of the 2D scale lighter pattern elements 119, which comprise openings or removed areas in the 2D scale darker pattern elements 115. This diffuse backing or coating 118 diffusely directs at least some of the incident light of the light beam 134 along the optical axis 144.

In one exemplary embodiment, the diffuse backing 118 is a diffusely reflecting coating-type backing 118A, which is a sprayed-on coating that coats the surface 114 in the area of the 2D scale lighter pattern elements 119. In another exemplary embodiment, the diffuse backing 118 is a diffusely reflecting substrate-type backing 118B, which approximately abuts the surface 114 and reflects the light beam 134 in the area of the 2D scale lighter pattern elements 119. In various exemplary embodiments, the diffusely reflecting substrate-type backing 118B conforms as closely as possible to the surface 114, to provide the best possible edge definition and location between the 2D scale lighter pattern elements 119 and the 2D scale darker pattern elements 115. In various exemplary embodiments, the substrate-type backing 118B is provided as the surface of a mounting member that holds the 2D scale 110.

In various exemplary embodiments where the patterning material layer 117 is a reflective thin film layer, the 2D scale lighter pattern elements 119 can be formed by conventional thin film patterning techniques. In various exemplary embodiments, the 2D scale darker pattern elements 115 and the 2D scale lighter pattern elements 119 are of a nominal size on the order of 5 to 10 microns.

In various exemplary embodiments, a nominal feature size characteristic of the quasi-random pattern portions of the 2D scale 110, as described in greater detail below, is comparable to the size of the 2D scale darker pattern elements 115 and the 2D scale lighter pattern elements 119. In such embodiments, the quasi-random pattern will approximate a quasi-random pattern of binary-valued scale features. In various other exemplary embodiments, the nominal feature size characteristic of the quasi-random pattern portions of the 2D scale 110 is significantly larger than the size of the 2D scale lighter pattern elements 119. In such embodiments, the individual distribution and/or placement density of the 2D scale lighter pattern elements 119 and the 2D scale darker pattern elements 15 within the extents of a nominal feature of a quasi-random pattern portion of the 2D scale 110 can be adjusted for each nominal feature such that the pixel intensity values in the images of the 2D scale 110 that correspond to each nominal feature can, in effect, provide an average grayscale value that is not restricted to binary image values for at least some of the nominal features. In such embodiments, the quasi-random pattern will approximate a quasi-random pattern including a spectrum of grayscale-valued scale features.

In various exemplary embodiments where the patterning material layer 117 is a photographic emulsion, the 2D scale darker pattern elements 115 and the 2D scale lighter pattern elements 119 can be formed by conventional exposure and processing techniques. In such exemplary embodiments, the 2D scale darker pattern elements 115 and the 2D scale lighter pattern elements 119 can generally be processed to provide either extreme contrast binary-like image values and/or grayscale values. In various exemplary embodiments, the 2D scale darker pattern elements 115 can be processed to be relatively more opaque and light-absorbent, and the 2D scale lighter pattern elements 119 can be processed to be wholly or partially transparent.

It should be appreciated that the exemplary embodiment of the 2D scale 110 shown in FIG. 4 provides several advantages. In this exemplary embodiment, the 2D scale 110 is easy to fabricate, in that the operable extents and locations of the diffuse portions of the 2D scale 110 are effectively defined by the edges of the scale darker pattern elements 115. Thus, the diffuse portions of the 2D scale 110 require no special processing to control the extents or locations of these diffuse portions. Furthermore, for the orientation of the 2D scale 110 shown in FIG. 4, contamination on the second surface 114' will tend to be out of focus in the detected image of the 2D scale 110. Furthermore, the surface 114 is protected from damage by the substrate 113 and/or the diffuse backing 118 and/or possibly by an external mounting element that abuts the surface 114. However, as previously discussed, in general, any scale configuration or orientation may be used to that provides a relatively high contrast scale image according to this invention when illuminated with the wavelengths of light provided by the light source 130.

The reflected light 136 from the illuminated portion of the 2D integrated scale pattern 300 that reaches the lens 140 is then projected as light 142 onto the light detector 160. In various exemplary embodiments, the lens 140 can be a biconvex lens having a diameter of approximately 3 mm and a focal length f of approximately 4.5 mm. As previously mentioned, in various exemplary embodiments, the light 142 passes through the pinhole aperture 152 in the pinhole aperture plate 150. The lens 140 is spaced from the pinhole aperture plate 150 by a distance that is approximately equal to the focal length f of the lens 140, making the magnification of the image of the integrated scale pattern 300 on the light detector 160 approximately independent of the object distance g.

In particular, when the pinhole aperture plate 150 is used, the light 154 passed by the pinhole aperture 152 is then projected a distance d along the optical axis 144 and onto the surface of the 2D image elements 162 of the 2D array 166 of the light detector 160. For such a telecentric configuration, the magnification of the image features of the 2D integrated scale pattern 300 thus depends primarily on the relationship between the focal length f and the distance d, and is approximately equal to d/f.

More generally, for configurations where the aperture 152 is relatively large or the pinhole aperture plate 150 is omitted, the magnification will vary with the object distance g. In this case, the approximate magnification M of the image features within the detected portion of the light reflected from the illuminated portion of the 2D integrated scale pattern 300 onto the 2D array 166 of the image elements 162 is:

$$M \approx (f+d)/g, \quad (1)$$

where:
g is the object distance;
f is the focal length of the lens 140; and
d is the distance to the surface of the 2D array 166, beyond the focal length of the lens 140.

In various exemplary embodiments, typical values for these parameters of the 2D optical position transducer 100 include: g≈4.5 mm, f=4.5 mm, and d=28.35 mm. As a result, the approximate corresponding magnification M is 7.3. It should be appreciated that in selecting of the size of the pinhole aperture 152 there is also a tradeoff between the depth of field of the image of the 2D integrated scale pattern 300, that is, the amount of blurring of the image when the object distance g is varied due to readhead gap misalignment or the like, and the image intensity on the array 166. In one exemplary embodiment, the pinhole aperture 152 has a diameter of 0.8 mm. In various other exemplary embodiments, the pinhole aperture 152 has a diameter between 0.5 and 2.0 mm. In cases where it is difficult to precisely calculate a magnification, it should also be appreciated that the effective magnification can also be determined experimentally for a given position encoder design and specified operating parameters. For example, the effective magnification can be determined based on a known spacing of the image elements along each axis and the observed image size of various scale features of known dimensions.

To acquire an image, the signal generating and processing circuitry 200 outputs a drive signal on the signal line 132 to drive the light source 130 to emit the light beam 134. The light beam 134 illuminates a portion of the 2D integrated scale pattern 300, which is imaged onto the 2D array 166 of the image elements 162 of the light detector 160. The signal generating and processing circuitry 200 then inputs a plurality of signal portions over the signal line 164, where each signal portion corresponds to the image value detected by one or more of the individual image elements 162.

To determine the current displacement of the readhead relative to the 2D integrated scale pattern 300 along each of the two dimensions, the signal portions for a current image received from the light detector 160 by the signal generating and processing circuitry 200 are input and stored in memory. The current image is then analyzed to determine the absolute position between the readhead 126 and the 2D scale 110 along each dimension. Of course, it should be appreciated that storing the image received from the light detector can be skipped if the absolute position can be calculated on the fly. In various exemplary embodiments, in one portion of the analysis, one row or column of the image elements 162 extending in a direction corresponding to at least one of the measuring axes 111 and 112, or at most a small number of rows or columns, of the current image are selected for analysis.

As discussed in greater detail below, in one portion of the analysis, a 2D code portion that appears in the current image is located. This located 2D code portion is decoded to determine a first-resolution 2D absolute position defined by the located code portion. The 2D location of the located code portion, or of a predetermined portion of, or associated with, the located code portion, is then determined relative to the current image frame, that is, relative to the 2D array 166 of the image elements 162.

This determined 2D location relative to the current image frame refines the 2D absolute position of the readhead 126 relative to the 2D integrated scale pattern 300 from the first resolution 2D location indicated by the decoded code portion to a second resolution 2D location. In various exemplary embodiments, this second resolution 2D location is a pixel resolution and corresponds to the pixel spacing or pitch of the imaging elements 162 along each of the two dimensions or axes of the 2D array 166.

It should be appreciated that the highest achievable second resolution 2D location corresponds to a true pixel resolution. That is, the second resolution along each axis is a resolution that reduces the uncertainty of the absolute location measurement along that axis to a resolution corresponding to the magnification along that dimension provided by the readhead 126 and no more than one to two pixel pitch increments along that dimension of the 2D array 166. Of course, it should be appreciated that the second resolution could be better than a pixel pitch if interpolation or centroid-based determinations are used.

At least a portion of the current image including a quasi-random pattern is also compared, on a pixel-by-pixel basis, to a reference image including a corresponding quasi-random pattern for each of a number of offset positions to determine the absolute position of the readhead to the scale to a third resolution. In various exemplary embodiments, the third resolution corresponds to a sub-pixel resolution position determination of the image on the array 160. The series of comparisons spans a correlation curve peak and/or valley, as disclosed in detail in U.S. patent application Ser. No. 09/731,671, incorporated herein by reference in its entirety.

That is, the reference image and the current image are processed to generate correlation function value points. In an exemplary embodiment, the current image is digitally shifted relative to the reference image over a range of offsets, or spatial translation positions, that include an offset that causes the pattern of the two images to most nearly align. The correlation function value points indicate the degree of pattern alignment, and thus indicate the amount of offset required to get the two images to align as the images are digitally shifted. This offset can be used to refine the absolute position of the readhead 126 relative to the 2D scale 110 from the second resolution to a third resolution corresponding to significantly less than one pixel pitch increment in either or both axes of the array 166 divided by the magnification provided by the readhead 100.

In various exemplary embodiments, the reference image is a quasi-random pattern image defined by a repeated quasi-random pattern portion of the 2D integrated scale pattern 300. The quasi-random pattern portion, including a quasi-random pattern that may be based on an actual and/or synthetic speckle pattern, is nominally identical to the quasi-random pattern of the reference image, and is repeated in the 2D integrated scale pattern 300 in both directions of the X and Y axes.

It should be appreciated that there are a number of different techniques for comparing the reference image to the current image. For example, in a first exemplary technique, the entire area of the frame of the current "displaced" image may be used when comparing the selected one or more rows on a pixel-by-pixel basis to the width of the entire frame of the reference image to generate a single correlation value. In this case, those pixels that lie in regions of the reference and current images that do not overlap with a region of the other of the current reference and displaced images are compared to pixels having a default comparison value, or are assigned a default comparison value, or the like. In other exemplary techniques, a partial image is compared. In either case, the series of correlation values that indicate the correlation peak and/or valley is generated by shifting the current image by one or more pixels in an appropriate direction relative to the reference image after each comparison is performed.

Figure 5:
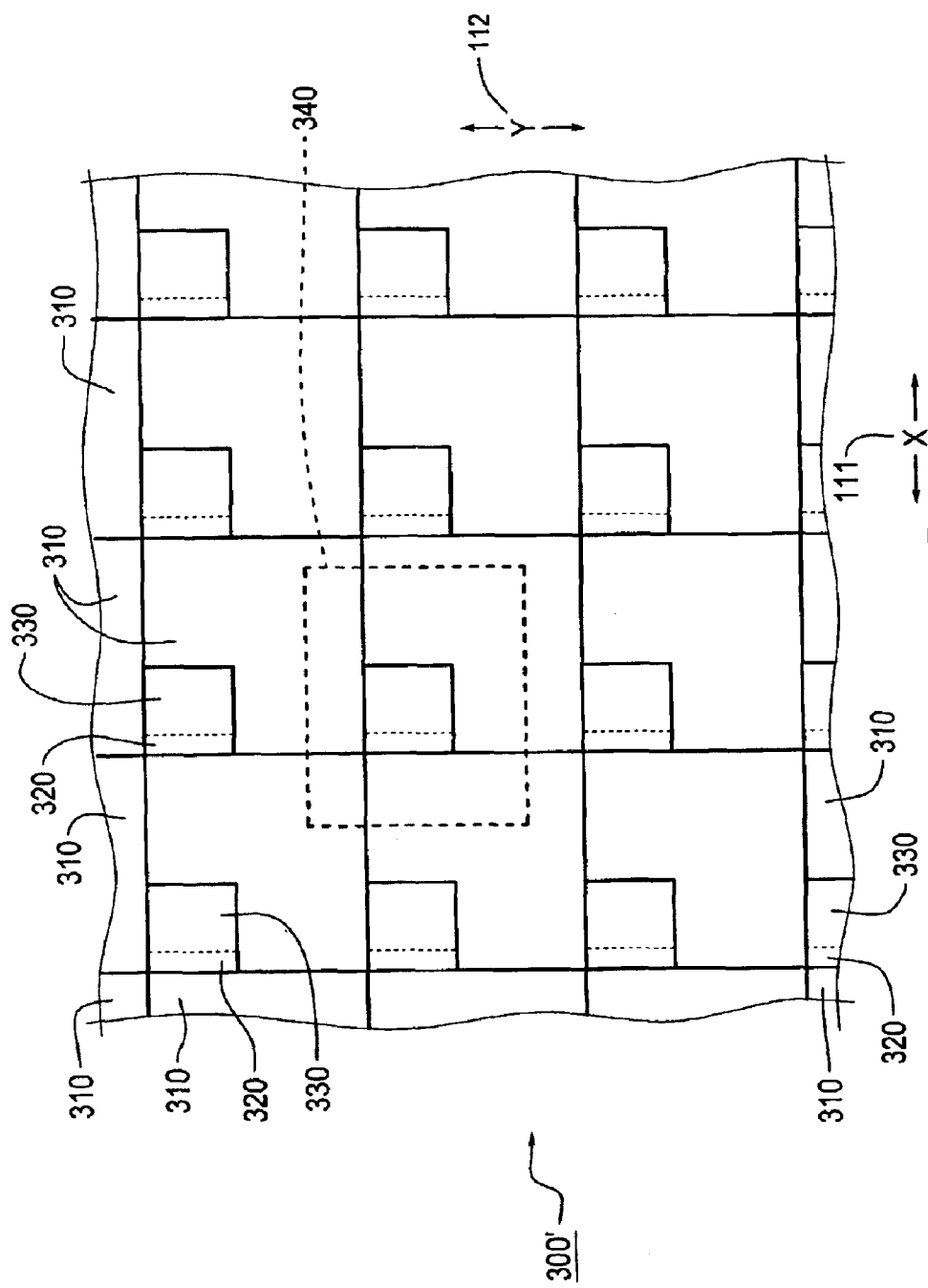
FIG. 5 illustrates a first exemplary embodiment of a generic 2D integrated absolute scale pattern according to this invention.

FIG. 5 illustrates a block diagram layout of a first exemplary embodiment 300' of the 2D integrated scale pattern 300 according to this invention. As shown in FIG. 4, the 2D integrated scale pattern 300' includes a plurality of portions 310 that each contain a 2D quasi-random pattern, and a plurality of 2D code portions 330. According to the principles of this invention, the plurality of 2D quasi-random patterns 310 and the plurality of 2D code portions 330 of the 2D integrated scale pattern 300' share, or are "integrated" in each local region of the 2D integrated scale pattern 300' approximately corresponding to the size of a detection window 340 described in greater detail below.

The integrated scale pattern 300' as shown in FIG. 5 extends over the entire area of a 2D scale 110 according to this invention that extends along each of the two measuring axes 111 and 112. That is, the plurality of 2D quasi-random pattern portions 310 and the plurality of 2D code portions 330 each have an extent along each of the two axes 111 and 112. In various exemplary embodiments, along each of the two axes 111 and 112, the 2D quasi-random pattern portions 310 and the 2D code portions 330 are arranged in a repeating sequence over the entire area of the 2D scale 110. Optionally, in some exemplary embodiments, each of the 2D code portions 330 include a predetermined feature 320, as described in greater detail below.

It should be appreciated that, by integrating both the 2D quasi-random pattern portions 310 and the 2D code portions 330 into a single unified structure in each local region of a 2D integrated scale pattern 300, a set of the sensing elements positioned over the 2D integrated scale pattern 300 anywhere within the boundary of the 2D integrated scale pattern 300, such as the set of the image elements 162 of the light detector 160, are usable to sense the information contained in the 2D quasi-random pattern portions 310 and the 2D code portions 330 at any combination of positions of the 2D scale 110 relative to the readhead 126 along the measuring axes 111 and 112.

As shown in FIG. 5, a detection window 340 that corresponds to the portion of the integrated scale pattern 300' that can be captured as a single image by the light detector 160 extends in two dimensions along the 2D scale 110 over at least a portion of the 2D integrated scale pattern 300. It should be appreciated that, in various exemplary embodiments according to this invention, due to the configuration of the 2D integrated scale pattern 300 according to this invention, the width of the detection window 340 along the Y axis within the integrated scale pattern 300 is not particularly critical, provided that the detection window 340 is nominally at least as wide as the distance along the Y axis between the corresponding boundaries of any two adjacent code portions, as describe in greater detail below. Similarly, it should be appreciated that, due to the configuration of the 2D integrated scale pattern 300 according to this invention, the length of the detection window 340 along the X axis within the integrated scale pattern 300 is not critical, provided that the detection window 340 is nominally at least as wide as the distance along the X axis between the corresponding boundaries of any two adjacent code portions, as describe in greater detail below.

It should be appreciated that, in various exemplary embodiments, the size of the light detector 160 and the magnification provided by the optics 140–152 of the readhead 126 are such that, in cooperation with the extents of the 2D quasi-random pattern portions 310 and the 2D code portions 330 along the measuring axes 111 and 112, the detection window 340 extends sufficiently along the measuring axes 111 and 112 that a complete 2D code portion 330 is guaranteed to appear in the detection window 340 regardless of the position of the readhead 126 within the area of the 2D scale 110. When the detection window 340 is at least this long and at least this wide, then decoding the complete 2D code portion 330 is significantly simplified relative to situations where some positions of the readhead 126 result in two or more incomplete 2D code portions 330 appearing in the detection window 340. That is, in some exemplary embodiments, the only substantive requirement on the size of the detection window 340 is that the detection window 340 needs to be sufficiently long and wide enough to ensure that at least one 2D code portion 330 lies completely within the detection window 340.

Alternatively, approximately as shown in FIG. 5, in various exemplary embodiments, a detection window 340 can be used such that the detection window 340 extends sufficiently along each of the two measuring axes 111 and 112 such that the information equivalent of a complete code portion 330 can be "reconstructed" from two or more separated segments of a number of the 2D code portions 330 regardless of the position of the readhead 126 and the 2D scale 110. In order to satisfy this condition, the detection window 340 generally extends along each of the two measuring axes 111 and 112 by an amount equal to or somewhat greater than the distance along that measuring axis 111 or 112 from the edge of one 2D code portion 330 of the 2D scale 110 to the corresponding edge of an adjacent 2D code portion 330. Such a distance generally includes a complete 2D code portion 330 at a majority of the potential scale positions. At some positions of the readhead 126, such a detection window 340 is also generally sufficient to include one complete 2D code portion 330 bounded at least by a number of scale elements of the 2D quasi-random pattern portions 310. In any case, for a detection window 340 having these kinds of extents along one or both of the two measuring axes 111 or 112, the patterns of the 2D code portions 330 must be chosen in light of the intended reconstruction technique. For example, the patterns may be chosen as sequential binary number codes or according to known pseudo-random "chain" code techniques, or the like. It should be appreciated that the associated reconstruction operations may be simplified and/or made more robust or faster in exemplary embodiments that include the predetermined feature 320 in the 2D code portions 330.

In the first exemplary embodiment of the 2D integrated scale pattern 300' shown in FIG. 5, the predetermined portions 320 are located at one side of the 2D code portions 330. However, it should be appreciated that, in various other exemplary embodiments, predetermined portions 320 are located along the top of the 2D code portions 330, or at two or more edges of each 2D code portion 330, or the like. In such cases, the predetermined portions 320 arranged along one edge of the code portions 330 may be distinct from the predetermined portions 320 along another edge of the code portions 330. In various other exemplary embodiments, the predetermined portions 320 are located more toward the center of the code portions 330.

The predetermined portions 320 may be any feature or combination of features that may be reliably and readily distinguished from the other pattern features of the 2D quasi-random pattern(s) appearing on the 2D quasi-random pattern 310 and/or the 2D code portions 330. For example, such features include, but are not limited to, a bright or dark scale feature that has a unique length along the measuring axis 111 and/or a unique length along the measuring axis 112, a unique pattern of bright and/or dark scale features along the measuring axis direction 111 and/or along the measuring axis 112, and or one or more scale features which have a unique color or intensity detectable by the image elements 162 of the light detector 160. In various exemplary embodiments, all of the predetermined portions 320 are identical.

Depending on the signal processing algorithms used, the predetermined portions 320 may be omitted. However, it should be appreciated that using such predetermined portions 320 simplifies the signal processing algorithms used for rapidly and robustly identifying and locating the 2D code portions 330 within the detection window 340.

Regardless of whether the predetermined portions 320 are included, each of the 2D code portions 330 contains a distinct and/or unique pattern or code group of code elements. This distinct and/or unique pattern of code elements allows at least one position value associated with a particular 2D code portion 330 that appears in the detection window 340 to be definitely determined. Since the 2D location of each particular 2D code portion 330 within the 2D scale 110 is predefined or can be calculated, identifying which 2D code portion 330 appears in the detection window 340 by determining the particular distinct and/or unique pattern of code elements of that code portion 330 allows the 2D absolute position of the detection window 340, and thus the readhead 126, relative to the 2D scale 110 to be roughly determined at a first resolution similar to the size of the detection window 340 and/or the spacing between the 2D code portions 330.

That is, while the 2D location of a given 2D code portion 330 within the 2D scale 10 relative to a given origin point may be known to a high degree of accuracy and precision, the 2D location of the 2D code portion 330 and the one or more surrounding 2D quasi-random patterns 310 relative to the detection window 340 are not necessarily known based on the operations of simply determining the code value of the 2D code portion 330 appearing in the detection window 340. In particular, the one or more 2D quasi-random patterns 310 and the 2D code portion 330 could be located anywhere within the 2D detection window 340.

As indicated above, the measurement values along each of the two measuring axes 111 and 112 corresponding to any particular 2D code portion 330 can be predefined by the distinct and/or unique code pattern, or can be calculated, or otherwise determined, from the distinct and/or unique code pattern. That is, in various exemplary embodiments, the distinct and/or unique code pattern is stored within a look-up table that also stores the measurement values along each of the two measuring axes 111 and 112 of the nominal 2D location on the 2D scale 110 corresponding to the 2D code portion 330 that contains that distinct and/or unique pattern. In this case, in various exemplary embodiments, the distinct and/or unique patterns can occur in any desired order or sequence, where no relationship between the distinct and/or unique patterns of adjacent ones of the 2D code portions 330 needs to be present. In this case, the distinct and/or unique patterns can be distributed among the 2D code portions 330 in any desired way, such as, for example, to increase the distinction between the distinct and/or unique patterns of adjacent ones of the 2D code portions 330.

In various other exemplary embodiments, the distinct and/or unique patterns can objectively correspond in some way to the 2D location of the 2D code portions 330 containing these distinct and/or unique patterns. This correspondence can then be used to directly determine or calculate the 2D absolute position of the 2D code portion 330 within the 2D scale 110, and thus the 2D absolute position of the detection window 340 and thus the readhead 126 relative to the 2D scale 110. In various exemplary embodiments, the 2D code portions 330 are arranged within the 2D scale 110 at a regular respective pitch or spacing along each of the X and Y axes, respectively.

The distinct and/or unique pattern of a particular 2D code portion 330 defines at least one binary or higher-modulus number, such as two respective X and Y binary or higher-modulus numbers, in the unique pattern or code word. In various exemplary embodiments where respective X and Y binary or higher-modulus numbers are defined, the respective X and Y numbers indicated by the 2D code portions 330 that are sequential along the respective measuring axes 111 or 112 of the 2D scale 110 each define a particular sequence along the respective measuring axes 111 or 112.

Thus, in such exemplary embodiments, for example, along either respective axis, a first 2D code portion 330 in a sequence of such 2D code portions 330 extending along that axis would have a distinct and/or unique pattern that defines a respective first number in some defined numerical sequence along that respective axis. The number can then be increased by one increment for each successive 2D code portion 330 in that sequence along that axis.

It should be appreciated that, when sequences of numbers or code words are used, it is particularly fast and easy to reconstruct a complete code word from a trailing segment of a number or code word of one 2D code portion 330 imaged in a left and/or upper portion of the detection window 340 and a leading segment of a number or code word of at least one adjacent 2D code portion 330 imaged in a right and/or bottom portion of the detection window 340. Thus, sequences of numbers or code words are of particular utility when the span of the detection window 340 relative to the 2D integrated scale pattern 300' is desired to be of a minimum usable size that is smaller than that which guarantees that at least one complete uninterrupted 2D code portion 330 is included in every possible image of the 2D scale 110. Of course, more complicated and irregular constructions, formulas and methods can be used to relate the distinct and/or unique patterns and the 2D locations of the 2D code portions 330 that contain these distinct and/or unique patterns.

It should be appreciated that, although each particular 2D code portion 330 is distributed over a 2D region extending along both of the measuring axes 1111 and 112, each particular 2D code portion 330 nevertheless uniquely corresponds to or identifies the measurement values along each of the two measuring axes 111 and 112 that are associated with a particular point in the area of the 2D scale 110. It should be appreciated that, for each particular point in the area of the 2D scale 110 corresponding to measurement values along the two measuring axes 111 and 112 indicated by a particular 2D code portion 330, that point can be referred to as a local datum.

In general, the local datum may be a defined point along an edge, a combination of X and Y coordinates of various edges or feature centers, an area center point, or any other localizable characteristic of one or more specifically recognizable bright and/or dark scale features of the 2D code portion 330 that can be located relative to the detection window 340. It should be appreciated that, according to this invention, the local datum is not necessarily a separate feature or characteristic that must be specially added to the 2D integrated scale pattern 300. Rather, the signal processing associated with the images of the 2D integrated scale pattern 300 may implicitly choose and use any specifically recognizable localizable feature or characteristic of the 2D integrated scale pattern 300 as a local datum.

In one exemplary embodiment, the local datum is conveniently chosen as a characteristic of a 2D scale feature of the 2D code portion 330 that is immediately adjacent the portion of the 2D code portion 330 that indicates the X and Y measurement values associated with that local datum. In a further exemplary embodiment, the local datum is conveniently chosen as a characteristic of the predetermined portion 320 associated with the code portion 330 that indicates the X and Y measurement values associated with that local datum, such as code position indicator, as described in greater detail below. Such exemplary embodiments may simplify the signal processing algorithms required for rapidly and robustly identifying and locating the local datum within the detection window 340.

In general, the local datum can be located relative to the detection window 340 before, during or after the 2D code portion 330 that appears in the detection window 340 has been analyzed to determine the first-resolution 2D absolute position and/or the third-resolution 2D absolute position. For example, identifying and/or locating the local datum may be based on well-known edge-finding or centroid-finding techniques, or the like, applied to image intensity values associated with the various image elements 162. In any case, the 2D location of the local datum relative to the detection window 340 is used to refine the resolution of the 2D absolute position determination to a second resolution finer than the previously-described first resolution.

It should be appreciated that, by using the 2D integrated scale pattern 300 according to this invention, in various exemplary embodiments, only a limited number of rows and/or columns of the imaging elements 162 extending along the measuring axis 111 needs to be analyzed to determine the location of the local datum relative to the detection window 340 to the second resolution. Furthermore, the second resolution location of the local datum relative to the detection window 340 can be used to select and/or narrow the range of offsets or spatial translation positions over which the current image is digitally shifted relative to the reference image in order to determine the offset that causes the pattern of the two images to most nearly align. Thus, a system using a 2D integrated scale pattern 300 according to this invention can achieve fast signal processing.

Figure 8:
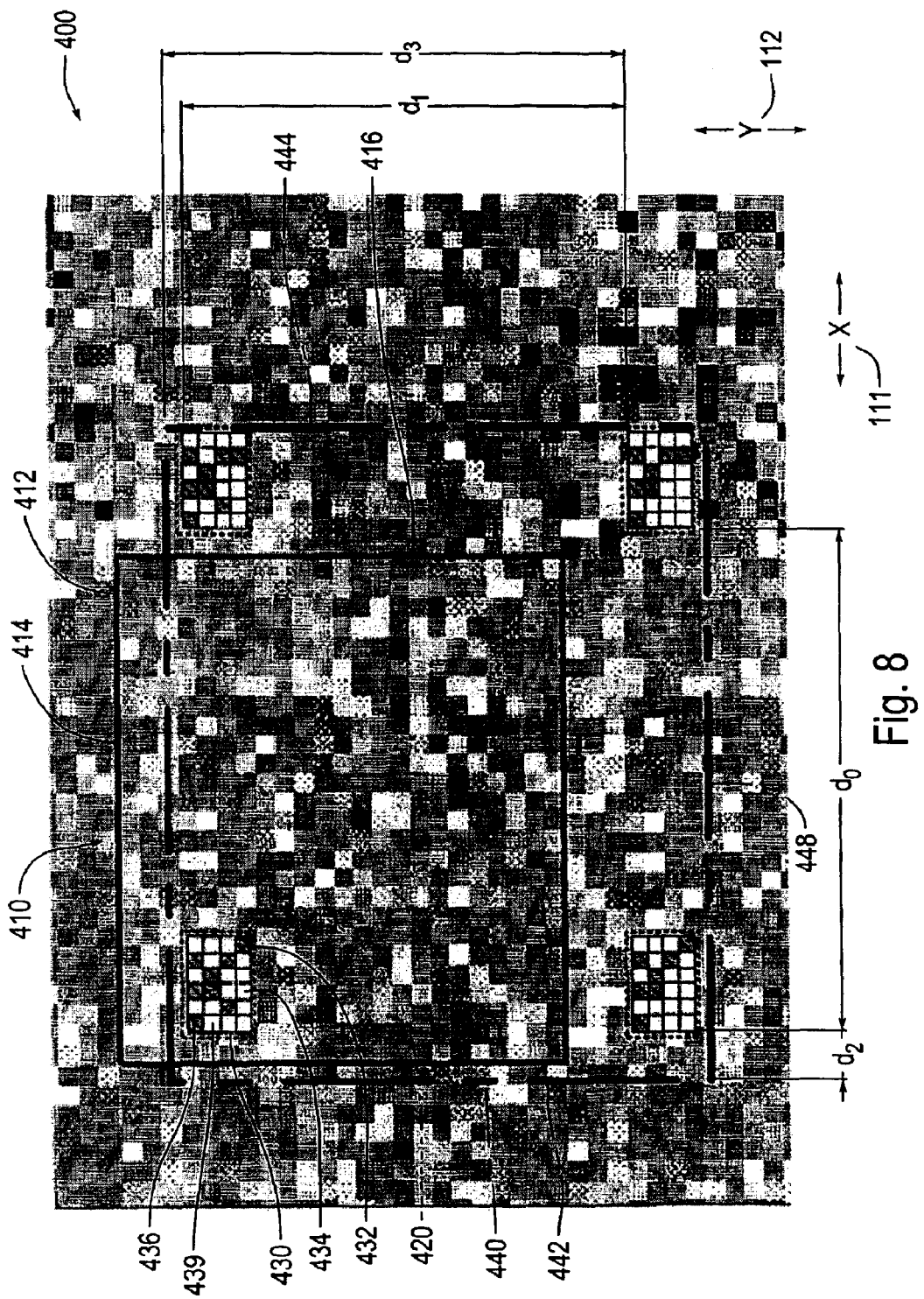
FIG. 8 illustrates a 2D portion of a first specific exemplary embodiment of the generic 2D integrated absolute scale pattern shown in FIG. 4.
Figure 9:
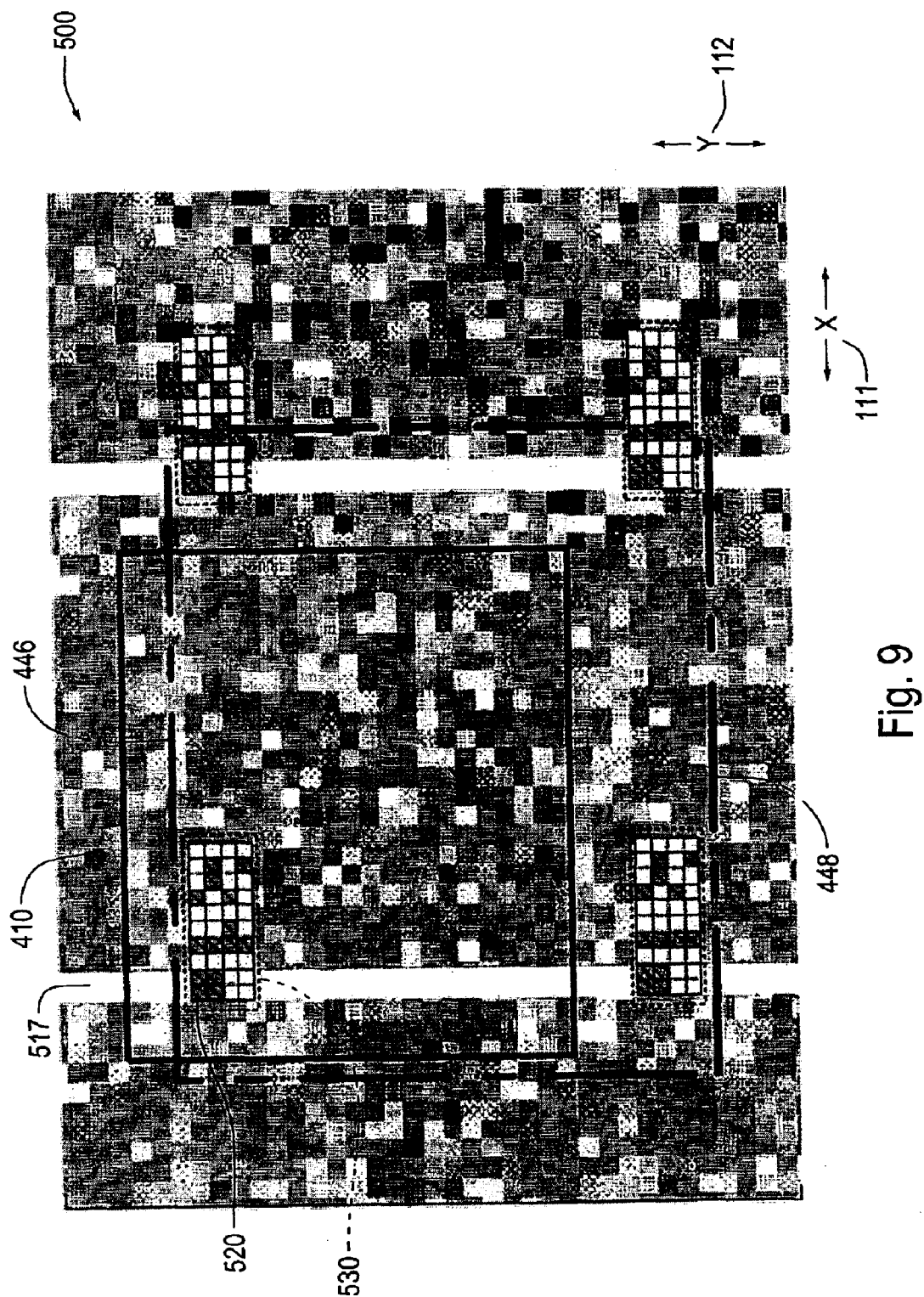
FIG. 9 illustrates a 2D portion of a second specific exemplary embodiment of the 2D generic integrated absolute scale pattern shown in FIG. 4.
Figure 10:
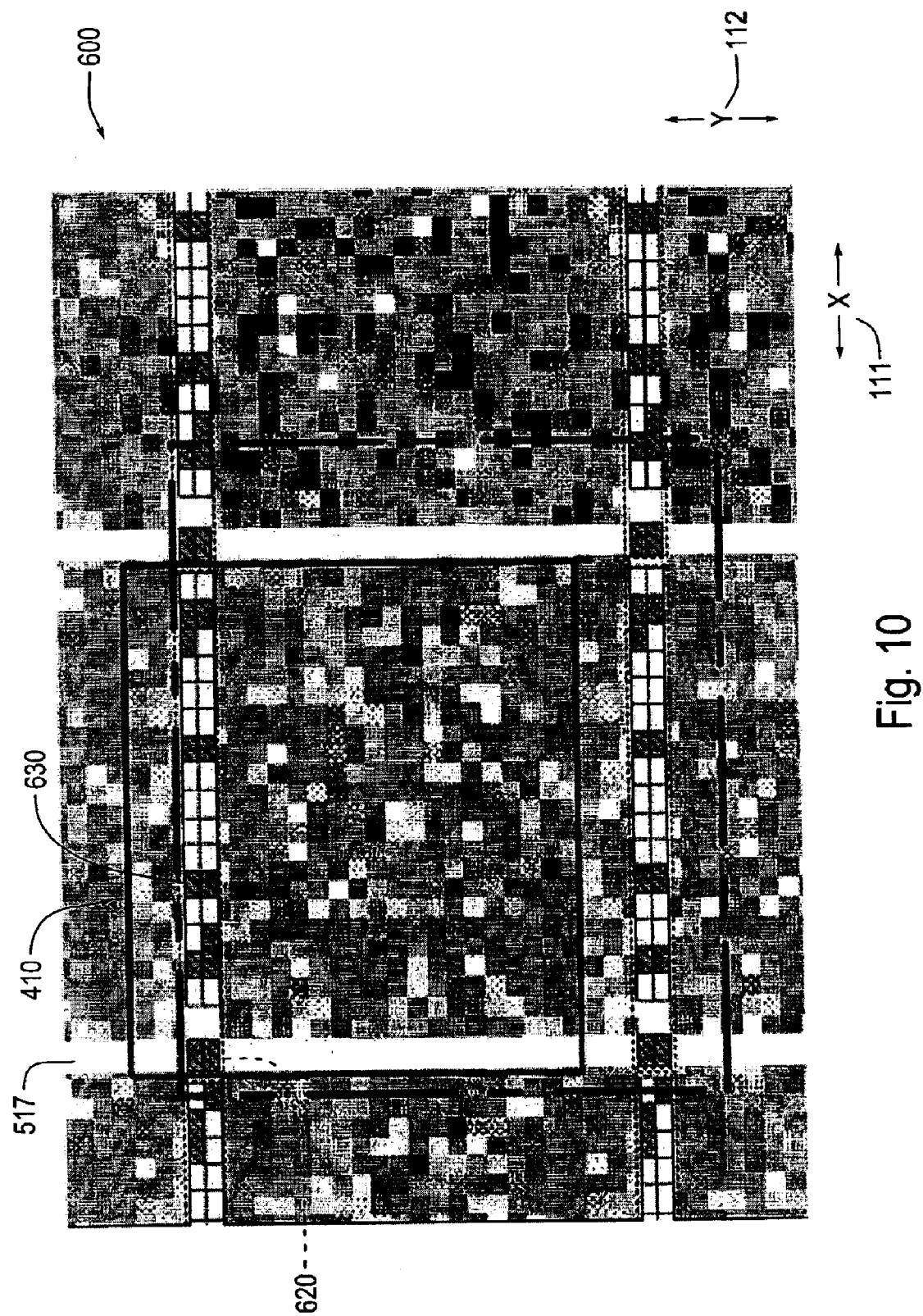
FIG. 10 illustrates a 2D portion of a third specific exemplary embodiment of the 2D generic integrated absolute scale pattern shown in FIG. 4.

It should be appreciated that although the code elements of the code portion and the nominal quasi-random pattern feature size of the 2D quasi-random pattern portions 310 are shown as approximately equal in FIGS. 8–10, in various other embodiments the code elements may be 2 times larger or more than the nominal quasi-random pattern feature size.

In yet other embodiments the code elements may be 2 times smaller or more than the nominal quasi-random pattern feature size. Regardless of their sizes relative to one another, in various exemplary embodiments, the nominal feature size of the quasi-random pattern, the size of code elements of the code portion, and the magnification provided by the configuration of the readhead 126 are chosen such that the size of code elements of the code portion and the nominal quasi-random pattern feature size of the 2D quasi-random pattern portions 310 on the light detector 160 are respectively each at least three times the pixel pitch of the image elements 162 along each of the two measuring axes 111 and 112. In various exemplary embodiments, along each of the two measuring axes 111 and 112, a robust and simple datum locating technique is chosen, such as edge-finding at a resolution equal to one pixel pitch or greater, based on pixel intensity value transitions, for example. Such configurations are robust, and further allow both simple and fast signal processing.

One or more 2D quasi-random pattern portions 310 can be used to refine the determination of the 2D absolute position of the 2D scale relative to the detection window 340, and thus to the readhead 126, to a third resolution. The third resolution has accuracy along each of the two measuring axes 111 and 112 that is at least a few times finer, and may be many times finer, than the nominal feature size of the quasi-random pattern and/or the nominal feature size of the quasi-random pattern in an image detected by a readhead according to the principles of this invention. In various exemplary embodiments, the third resolution corresponds to locating, along each of the two measuring axes 111 and 112, the projected image of the 2D scale 110 relative to the detection window 340 to a sub-pixel resolution.

It should be appreciated that, in various exemplary embodiments the operations are omitted that determine the location of the local datum relative to the detection window 340 to the second resolution based on determining the location of the local datum image in a detected image. In such embodiments, the correlation function values and/or the correlation curve are created to directly determine the location of the projected image of the 2D scale 110 relative to the detection window 340 to a sub-pixel resolution.

In various other exemplary embodiments that determine the location of the image of the local datum relative to the detection window 340 to the second resolution and the second resolution corresponds to resolution of approximately one pixel pitch, the correlation function values and/or the correlation curve are created at least in part to obtain the subpixel resolution.

The incorporated 671 application discloses a variety of methods for determining to a high accuracy the pixel and/or subpixel location of a peak or trough of a correlation curve based on relatively few correlation function value points around the that peak or trough. It should be appreciated that any of these techniques, or any other appropriate known or later-developed technique, can be used to determine the offset position of the projected image of the 2D scale 110 relative to the detection window 340 to a pixel and/or subpixel resolution. Thus, the position of the 2D scale 110 relative to the readhead 126 is determined to a third resolution and accuracy which is at least a few times finer, and may be many times finer, than the nominal feature size of the features of the quasi-random pattern and/or the magnified pixel pitch.

In various exemplary embodiments of the 2D integrated scale according to this invention, a large proportion of the image includes the 2D quasi-random pattern portions 310 that can be effectively correlated with a corresponding representative reference image or pattern, regardless of the location of one or more code portions 330 in the image. Furthermore, in various exemplary embodiments that determine the location of the image of the local datum relative to the detection window 340 to the second resolution, the range of X and Y offsets required to find a correlation peak in the X and Y directions can be limited, since the approximate offset of the 2D quasi-random pattern portions 310 relative to the detection window 30 is known, as well as due to the high spatial frequency of the features of the 2D quasi-random pattern portions 310 in both the X and Y axes in the image. Thus, a 2D integrated scale according to this invention allows high-resolution 2D position determinations to be made at high speed, to support the overall high resolution and high-speed 2D absolute position measurement determination.

It should be appreciated that, when a 2D integrated scale pattern 300 includes tiling one or more repeated and predictable 2D quasi-random patterns, such as the one or more 2D quasi-random patterns incorporated into the 2D quasi-random pattern portions 310 of the integrated scale pattern 300' according to this invention, the high-resolution or third resolution position detection techniques usable with such 2D quasi-random patterns are particularly simple, accurate, fast and reliable relative to the techniques and results that might be achieved when tiling 2D patterns which do not include repeating large portions of the pattern in each tile, such as certain 2D bar code patterns and the like.

For example, in embodiments that use software- and/or hardware-based correlation techniques to determine the high-resolution position, the reference image or the hardware detector structure can be a single fixed configuration. Modifications of the hardware detector configuration, or updating or matching the reference image to the current image, or the like, are not required, since all images of the single quasi-random pattern repeated in each quasi-random pattern portion 310 are substantially similar and predictable. Furthermore, the accuracy of software- or hardware-based detection of the position of a substantially or fully repeated image or image portion tends to be less sensitive to image blur due to readhead misalignment or the like. Furthermore, since the reference image(s) used for correlation to the various current images of the quasi-random pattern portions 310 are derived from a static set of image data in memory, and since the quasi-random pattern(s) of the quasi-random pattern portions 310 are repeated across the scale, unlike speckle correlation measurement systems, long range displacement measurements do not accumulate significant errors.

In various exemplary embodiments, each quasi-random pattern portion 310 includes a substantially identical quasi-random pattern. The quasi-random pattern may be based on a real speckle pattern or a synthetic speckle pattern, as discussed in greater detail below.

Figure 7:
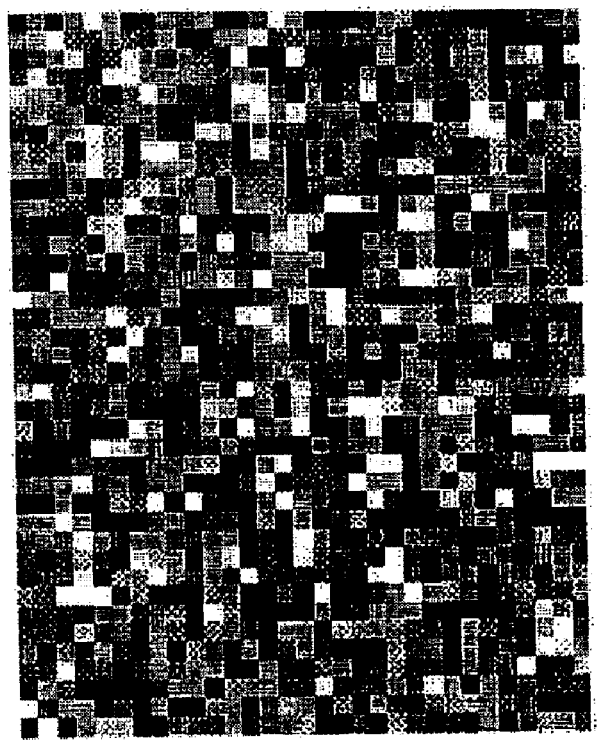
FIGS. 6 and 7 illustrate exemplary quasi-random patterns based on actual and synthetic speckle patterns, respectively, that are usable in a 2D integrated absolute scale pattern according to this invention.
Figure 6:
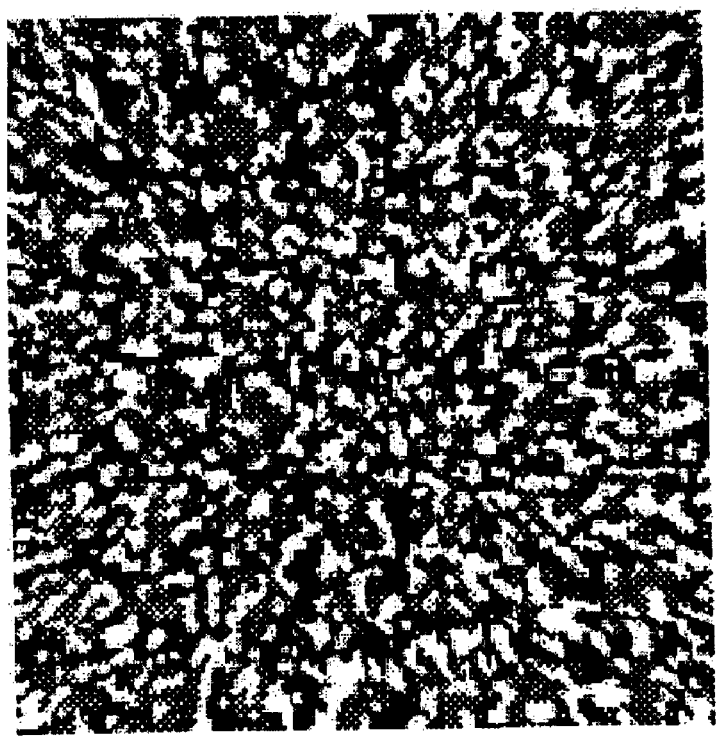

FIGS. 6 and 7 illustrate exemplary quasi-random patterns. Particularly, FIG. 6 shows a quasi-random pattern based on a real or actual speckle pattern. Generally, a speckle pattern can be generated by illuminating an optically rough surface with a coherent light source.

As shown in FIG. 6, the quasi-random pattern contains various nominal scale feature areas that predominantly correspond to black intensity levels, various nominal scale feature areas that predominantly correspond to white intensity levels and various nominal scale feature areas that include a distribution of high resolution patterned scale elements that provide an average gray intensity level for such scale feature areas. Such nominal scale features areas result in images with pixel intensity levels that are used in correlation analysis. It is believed by some that including features with average gray levels enhances the accuracy of some correlation analysis algorithms. However, in various other exemplary embodiments, only nominal scale feature areas that include predominantly white or black intensity levels are used. In various exemplary embodiments, a nominal size of the nominal scale feature areas shown in FIG. 6 is about 5 microns.

FIG. 7 shows a quasi-random pattern that is artificially generated. Similarly to the previous discussion related to FIG. 6, as shown in FIG. 7, various nominal feature areas correspond to various intensity levels. The nominal size of the nominal scale feature areas shown in FIG. 7 are also on the order of 5 microns.

FIG. 8 illustrates a first exemplary embodiment of a 2D integrated absolute scale 400 corresponding to the 2D integrated scale pattern 300' shown in FIG. 5. As shown in FIG. 8, the 2D integrated scale 400 has a plurality of 2D quasi-random pattern portions 410, and a plurality of 2D code portions 430 arranged along both of the measuring axes 111 and 112. Additionally, in the exemplary embodiment shown in FIG. 8, the code portions 430 include predetermined pattern portions 420, which comprise the consistently patterned top rows and left columns of the code zones of the code portions 430, as described in greater detail below.

It should be appreciated that in various exemplary embodiments, a single quasi-random pattern generally coincides with, and is repeated in, the quasi-random pattern portions 410. That is, a single quasi-random pattern is repeatedly "tiled" in both the X and Y axes. According to the principles of this invention, it is advantageous to limit the number of different repeated quasi-random patterns to a number that may be simply and economically stored in the memory and efficiently correlated to actual images at high speed. Thus, in many exemplary embodiments, it is most economical and efficient to use a single quasi-random pattern, but this invention is not so limited to such embodiments.

In various other exemplary embodiments, a plurality of different, relatively smaller 2D quasi-random patterns are used in the 2D quasi-random pattern portions 410. For example, in various exemplary embodiments, on the order or two to six smaller quasi-random patterns are used in each. It should be appreciated that if all of such a plurality of such quasi-random patterns are different from one another, then the net effect remains that of a single combined quasi-random random pattern. However, in various exemplary embodiments, at least two of the plurality of such quasi-random patterns may be the same, provided that if this introduces the possibility of a peak offset position ambiguity when correlating a detected image according to the principles of this invention, that such ambiguity can be eliminated based on at least one of the previously described first or second resolution measurement values. In such embodiments, the net amount of memory required to store comparable reference image data correlatable to various detected images of the 2D quasi-random pattern portions 410 may be relatively smaller. However, the related correlation processing may be more complicated in various such embodiments. In some of these exemplary embodiments, the gray level of a feature or pixel in one quasi-random pattern can be a complement of the correspondingly located pixel in the other quasi-random pattern. For example, in such exemplary embodiments, when the gray level of a feature or pixel in one quasi-random pattern is black, the correspondingly located feature or pixel in the other quasi-random pattern is white.

In yet other exemplary embodiments, various 2D quasi-random pattern portions 410 use different portions of a relatively larger 2D quasi-random pattern. In such embodiments, the net amount of memory required to store comparable reference image data correlatable to various detected images of the 2D quasi-random pattern portions 410 may be relatively larger, but the related correlation processing may be faster in various exemplary embodiments.

The readhead 126 moves relative to the integrated scale 400 along the measuring axis directions 111 and 112. Each quasi-random pattern portion 410 includes a quasi-random pattern 412 having a first dimension 414 that extends along the first measuring axis 111, i.e., the X axis, and a second dimension 416 that extends along the second measuring axis 112, i.e., the Y axis. In various exemplary embodiments, each quasi-random pattern portion 410 contains or extends around one of the plurality of 2D code portion 430.

It should be appreciated that, in the exemplary embodiment shown in FIG. 8, the first and second dimensions 414 and 416 have the same extent along the respective Y and X axes. Thus, the quasi-random pattern portions 410, and thus, the one or more quasi-random patterns 412 are squares having the same extents along the X and Y axes. However, it should be appreciated that, in various exemplary embodiments, the first dimensions 414 and the second dimensions 416 are not the same, such that the extents of the quasi-random pattern portions 410 along X and Y axes are not the same. That is, in this case, the quasi-random patterns 412 are rectangles.

In various exemplary embodiments, the code portions 430 of the integrated scale 400 include a plurality of code zones, which are indicated in FIG. 8 by the matrix of boundary lines in the code portions 430. A code element 432 or a space 434 is present in each code zone to provide a distinct and/or unique pattern of highly-contrasting code elements and spaces in each code portion 430, as described above.

In various exemplary embodiments, the extents of each code zone are conveniently made the same. However, in various other exemplary embodiments, the extents of various code zones may vary. In this case, this variation is accommodated in the corresponding signal processing algorithms.

Along each of the first and second measuring axes 111 and 112, one code portion 430 is separated from the adjacent code portions 430 by one or more quasi-random pattern regions of one of the quasi-random pattern portions 410. Each code portion 430 indicates, for each of the first and second measuring axes 111 and 112, the measurement values along the first and second measuring axes 111 and 112 associated with a local datum 436. As previously discussed, the local datum 436 is not necessarily a separate feature or characteristic of the 2D integrated scale 400. Rather, the signal processing technique associated with the 2D integrated scale 400 implicitly chooses any specifically recognizable localizable feature or characteristic of the 2D integrated scale 400 as the local datum 436.

In the first exemplary embodiment of the 2D integrated scale 400 shown in FIG. 8, the local datum 436 is conveniently chosen as the upper left corner of the code zone 439 in the predetermined portion 420. However, it should be recognized that this choice is somewhat arbitrary, as described above. Thus, in various other exemplary embodiments, the local datum 436 can be a uniquely identifiable feature location that repeatedly occurs in the quasi-random pattern portions 410.

In the embodiment shown in FIG. 8, each local datum 436 is spaced from the adjacent local datum 436 along the first measuring axis 111 by a distance $d_0$. Similarly, in the embodiment shown in FIG. 8, each local datum 436 is spaced from the adjacent local datum 436 along the second measuring axis 112 by a distance $d_0$. In various exemplary embodiments, the distances $d_0$ and $d_1$ are also chosen with respect to the characteristics of the readhead 126 such that there is always at least one complete code portion 430 within the detection window 440.

In various exemplary embodiments, the code elements 432 are relatively reflective elements, and the spaces 434 are relatively less reflective in the absence of a code element 432. In particular, if the code zones having the relatively reflective code elements 432 are decoded as a binary 1, then empty code zones, that is, the spaces 434, are decoded as binary 0. Thus, the pattern of code elements 432 and spaces 434 in the code zones form a binary number or code word that can be decoded to identify the measurement values of the local datum point 436 along the first and second measurement axes 111 and 112 to the first resolution. Thus, the location of the detection window 440 and the readhead 126 relative to the 2D scale along the first and second measuring axes 111 and 112 can be determined to the first resolution.

As shown in FIG. 8, the exemplary predetermined portions 420 use the first row of code zones on the top of the code portions 430 and the first column of codes zones on the left of the code portions 430. As shown in FIG. 8, the exemplary predetermined portions 420 are identical regardless of the position of a particular predetermined portion 420 along the first and second measuring axes 111 and 112. It should be appreciated that the function of these predetermined portions 420 is primarily to enable the signal processing that searches for a code portion 430 in the detection window 440 to be simple, fast and robust. In various exemplary embodiments, the code zones along the row of the predetermined portion 420 always have alternating code values that provide highly-contrasting intensity values in corresponding image portions.

In various exemplary embodiments, the plurality of code portions take up less than three percent of the area of the 2D integrated scale 400. Thus, in various exemplary embodiments, at least 90% of the area of the integrated scale 400 is used for the one or more quasi-random patterns 412, enhancing the accuracy of high-resolution position determination, as described above. In one exemplary embodiment, the code zones have an extent of 10 $\mu$m along each of the first and second measuring axes 111 and 112. The spacing $d_0$ along the first measuring axis 111 between corresponding points on the code portions 430 is 320 $\mu$m. The spacing $d_1$ along the second measuring axis 112 between corresponding points on the code portions 430 is 280 $\mu$m. The detection window 440 corresponds to a light detector 160 having, for example, approximately 352 pixels in the direction corresponding to the first measuring axis 111, and, for example, approximately 288 pixels in the direction corresponding to the second measuring axis 112, such that an 11 $\mu$m region on the scale 110 projects an image corresponding to approximately 10 pixels on the light detector 160. Thus, in exemplary embodiments having these dimensions, the 15-bit codes arranged in the code portions 430 allow an absolute 2D position measurement area of nearly 3000 square millimeters. This would allow a 2D absolute scale 110 to have a square 2D integrated scale pattern 300 having approximately 54 mm sides. The inventors have achieved reliable sub-micrometer measurements using comparable scale parameters and a compact readhead. Thus, compact and practical absolute position measurement devices according to the principles of this invention provide a particularly useful combination of high resolution, speed and 2D absolute measurement area range.

Regarding the configuration shown in FIG. 8, it should be appreciated that the unique pattern of the highly-contrasting intensity values of the predetermined portions 420 and, more generally, the code spaces 434 and code elements 432, is designed to be distinguishable from the surrounding quasi-random intensity values of the quasi-random pattern 412. Furthermore, in such embodiments, the code spaces 434 and code elements 432 are adequately visible despite contamination, defects, and static and dynamic variations in the gap between the scale 110 and readhead 126, but fine enough to allow a large absolute area range by providing a large number of bits in a small proportion of the scale length or area, so that more of the scale length or area can be dedicated to the information in the quasi-random patterns 412 that enhances the high-resolution position determination. Of course, the code zones can be made relatively coarser. However, in such cases, the code portion 430 becomes relatively larger and the corresponding length of the readhead 126 relatively increases and/or the maximum absolute area range relatively decreases for a reduced number of code bits readable within a given readhead size.

For the exemplary embodiment shown in FIG. 8, in operation, an image of the 2D integrated scale 400 is captured corresponding to the detection window 440 shown in FIG. 8. In various exemplary embodiments, the bright and dark zones in the code portion 430 are at maximal bright and maximal dark brightness levels in the captured image. Such maximal bright and maximal dark brightness levels enable easy and simple identification of the predetermined portion 420. The captured image is then analyzed to identify the location of the predetermined portion 420 that appears in the detection window 440. In various exemplary embodiments, a sparse search is performed to locate a predetermined portion 420 appearing in the detection window 440. That is, space apart rows of the image are searched to find a pattern of bright and dark portions of the captured image that corresponds to the predetermined pattern of code elements 432 and spaces 434 that appears in a top portion of each predetermined portion 420.

For example, in various exemplary embodiments, a row that is approximately one half of the code zone height from the top of the captured image in the detection window 440 is selected as an initial search row. In various exemplary embodiments where the code zones of the predetermined portions 420 extend approximately 10 pixels along the second measuring axis 112 in the captured image, this distance from the top of the captured image is 5 pixels. In this exemplary embodiment, the initial row is analyzed to determine if it contains a series of transitions spaced approximately 10 pixels apart. The 10-pixel spacing is selected because the code zones of the predetermined portions 420 also extend approximately 10 pixels along the first measuring axis 111 in the captured image.

If the initial row does not contain a series of transitions spaced approximately 10 pixels apart, each fifth row, moving down the detection window 440, is selected in turn and analyzed until a row having a series of transitions spaced approximately 10 pixels apart is located. In various exemplary embodiments, a limited number of adjacent rows can also be analyzed in the vicinity of the series of transitions, to determine the upper and lower bounds of at least one row of code elements and as a result determine a central row of pixels that is approximately aligned with the middle of the code elements. Subsequent processing which jumps to other rows or known feature locations in the image can be made robust and/or simple by referencing such jumps to this centrally-located pixel row.

It should be appreciated that, in various exemplary embodiments, additional analysis of the location of the row containing the predetermined portion 420 can be performed to ensure that the located predetermined portion 420 and the corresponding code portion 430 lie entirely within the detection window 440. In general, the processing will be simplified if a single code portion 430 that lies entirely within the detection window 440 is used, rather than using portions of two code portions 430 that each has a portion extends outside of the detection window 440.

In various exemplary embodiments, to ensure that a single code portion 430 that lies entirely within the detection window 440 is used, once a row that apparently contains predetermined portion 420 is located, the number of rows between the located row and the top of the detection window 440 is compared to a pair of threshold values. If the number of rows is greater than a first threshold value but less that a second threshold value, the located predetermined portion 420 and the corresponding code portion 430 lie entirely within the detection window 440.

However, if the number if rows is less than the first threshold value, it is possible that what appears to be a row containing a predetermined portion could instead be a row that extends through a "matching" code of the code portion. In this case, a row that lies a predetermined number of rows below the located row is selected for further analysis.

Starting with the new row that is the predetermined number of rows below the located row, every fifth row is analyzed as outlined above to find a second row containing a second predetermined portion 420. The second row is sure to contain an "actual" second predetermined portion 420 due to the value for the predetermined number. If this row is also above the second threshold value, then the second predetermined portion 420 is "satisfactory" and the corresponding code portion 430 is sure to lie entirely within the detection window 440. Otherwise, the first apparent predetermined portion 420 is in the vicinity of an actual satisfactory predetermined portion 420 and the corresponding code portion 430 are sure to lie entirely within the detection window 440.

It should also be appreciated that, instead of the techniques outlined above, any other suitable technique for locating a predetermined portion 420 could be used to locate the predetermined portion 420.

Once the central row running through a satisfactory predetermined portion 420 that appears in the captured image is located, the code portion 430 is known to occur in a predetermined 2D location relative to the predetermined transition series in that located row. The predetermined portion 420 functions as a satisfactory "code position indicator". For example, in the exemplary embodiment shown in FIG. 8, the code portion of the code portion 430 will appear at a step a small distance, such as, for example, approximately 10 pixel rows, below the predetermined portion 420, and with its right boundary aligned with the right boundary of the predetermined portion 420. The pattern and extents of the bright and dark portions of the captured image, corresponding to the code elements 432 and the unoccupied spaces in the code zones appearing in the code portion 430 adjacent to the located predetermined portion 420, are determined to extract the code word defined by these patterns and extents.

Then, the extracted code word either is used as an address entry into a look-up table or is used as a variable in a formula to determine the X and Y absolute position measurement values of the local datum 436 along each of the first and second measuring axes 111 and 112. These measurement values indicate the location of the detection window 440 and the readhead 126 relative to the 2D scale 110 along each of the first and second measuring axes 111 and 112 to a first resolution along each of the first and second measuring axes 111 and 112. The first resolution along each measuring axis 111 and 112 approximately corresponds to the spacing distances $d_0$ and $d_1$ along the first and second measuring axis 111 and 112, respectively, of the local datums 436 and/or the code portions 430. In the exemplary embodiment shown in FIG. 8, a given feature of the located predetermined portions 420 appearing in the detection window 440 near the analyzed code portion 430 serves as the local datum 436.

Alternatively, if the full extent of the 2D integrated scale 400 along at least one of the first and second measuring axes is a power of two multiple of the corresponding spacing distance $d_0$ and/or $d_1$ along that first and/or second measuring axis 111 and/or 112, then the binary code defined by the code elements 432 and the spaces 434 can be split into two code words. For example, the extent of the 2D integrated scale 400 along the first measuring axis 111 could be $2^n d_0$. Then, the extent of the 2D integrated scale 400 along the first measuring axis 111 would be less than or equal to $2^m d_1$, where n+m is less than or equal to the number of code zones in the code portions 430.

In this case, one of the code words would have at least n code zones. As a result, for any given code portion 430, one of the code words can be used to define the multiple of the spacing distance $d_0$ for the first resolution absolute position measurement value along the first measurement axis 111. Likewise, the other of the code words defines the multiple of the spacing distance $d_1$ for the first resolution absolute position measurement value along the second measurement axis 112. By multiplying the spacing distances $d_0$ and $d_1$ by the corresponding multiple, the absolute position measurement values along the first and second measuring axes 111 and 112 can be directly obtained from the two code words.

In various other exemplary embodiments, assuming that the total area of the 2D integrated scale 400 allows a sufficient number of the possible values for the codeword defined in the code portion 430 to be omitted, this exemplary embodiment can be used even if neither extent along the first and second measuring axes 111 and 112 of the 2D integrated scale 400 is a power of two multiple of the corresponding spacing distances $d_0$ and $d_1$.

To further refine the absolute position measurement resolution along the first measuring axis 111, it is convenient and sufficient to find the location of the local datum point 436 relative to a left edge 442 or a right edge 444 of the detection window 440. When the left edge 442 of the detection window 440 is used as the reference point relative to the local datum point 436, as shown in FIG. 8, the number of pixels corresponding to an offset distance $d_2$ of the local datum point 436 to the left edge 442 is easily determined to within one or a few pixels. This pixel distance may be converted to the actual offset distance $d_2$ based on the known geometric characteristics of the light detector 160 and the magnification of the readhead 126.

Similarly, to further refine the absolute position measurement resolution along the second measuring axis 112, it is convenient and sufficient to find the location of the local datum point 436 relative to a top edge 446 or a bottom edge 448 of the detection window 440. When the top edge 446 of the detection window 440 is used as the reference point relative to the local datum point 436, as shown in FIG. 8, the number of pixels corresponding to an offset distance $d_3$ of the local datum point 436 to the top edge 446 is easily determined to within one or a few pixels. This pixel distance may be converted to the actual offset distance $d_3$ based on the known geometric characteristics of the light detector 160 and the magnification of the readhead 126.

When the offset distances $d_2$ and $d_3$ are added to the code-determined absolute measurement X and Y absolute position measurement values, respectively, of the local datum 436, the 2D absolute position of the readhead 126 relative to the 2D scale 110 along the first and second measuring axes 111 and 112, respectively is known to a second resolution along each of the first and second measuring axes 111 and 112, and approximately corresponding to one or a few times the corresponding pixel pitch, divided by the magnification of the readhead 126.

It should be appreciated that the relatively lower resolution position determining operations described above use relatively little of the position information available in the detection window 440. To further refine the absolute position measurement between the readhead 126 and the 2D scale 110, it is desirable to use more of the information in the detection window 440, so that the effects of local fabrication inaccuracies, defects, contamination and the like are averaged out to provide a better signal-to-noise ratio and a more accurate position determination.

In particular, it is desirable to make a position determination based on some or all of the information and/or signals arising from at least some of the one or more quasi-random patterns 412 that may occur in the quasi-random pattern portion 410 present in the detection window 440, for example, as previously described for the correlation operations that provide the third resolution measurement values for the first and second measuring axes 111 and 112. In effect, the goal is to refine the estimate of the previously described offset distances $d_2$ and $d_3$. The difference between the actual peak or trough offset values in the X and Y axes and their expected offset values for an image where the local datum coincides with an established reference position can be used to refine the resolution and accuracy of the estimated offset distances $d_2$ and $d_3$, and the resulting absolute position determination. Specifically, the difference between the actual correlation peak or trough offset values in the X and Y axes and their respective expected offset values for an image where the local datum coincides with its 2D reference position are used to replace the previously estimated offset distances $d_2$ and $d_3$.

In various exemplary embodiments, somewhat less accurate correlation curve values can be determined, based on smaller portions such as a few rows and/or a few columns of quasi-random pattern 412 in the image, and such values can still be used to identify the pixel offset value of the peak or trough to the best resolution possible, as outlined in the 671 application, and the accuracy will still be sufficient for a number of useful applications. In various other exemplary embodiments, since at least one quarter of the quasi-random pattern 412 typically appears as an uninterrupted block in any acquired current image, correlation curve values can be determined based on approximately one quarter of the quasi-random pattern 412, and the accuracy will be sufficient for a majority of useful applications. Such embodiments avoid the need to "reconstruct" or "rearrange" various portions of various quasi-random patterns 412 that are distributed among various quasi-random pattern portions 410 that may be included in a current image, in order to effectively correlate the current image with the reference image.

However, in various other exemplary embodiments, the quasi-random pattern(s) 412 of either the current image or the reference image may effectively be "reconstructed" or "rearranged" prior to or during correlation signal processing such that the various portions of the various quasi-random pattern(s) 412 distributed among various quasi-random pattern portions 410 included in the current image, are ordered to match the reference image, in order to effectively correlate that at least the entire quasi-random pattern(s) 412 of the current image with the quasi-random pattern of the reference image. Such embodiments will provide the highest possible levels of resolution and accuracy.

In any case, it should be appreciated that to refine the absolute position measurement along each measuring axis, it is generally necessary to determine the offset position of the correlation function trough or peak, depending on the type of correlation used, relative to the one or more corresponding expected offset positions for an image where the local datum 436 coincides with its reference position, in order to carry out the previously described operations to refine the resolution and accuracy of the estimated offset distances $d_2$ and $d_3$, and the resulting absolute position determination to a high level of resolution.

A correlation function is generated by comparing the selected portion of a current acquired image to a corresponding reference image. As previously discussed, it should be appreciated that because the previously estimated offset distances $d_2$ and $d_3$ are accurate within a few pixels or so, these distances can be used to select and/or narrow the range of offsets or spatial translation positions over which the current image is digitally shifted relative to the reference image in order to determine the offset that causes the pattern of the two images to most nearly align. A first point of the correlation function is generated by comparing, on a pixel-by-pixel basis, each pixel of the selected portion of the current image to the reference image, as described in the incorporated 671 application. The additional points of the correlation function are generated by shifting, by one pixel for each point, the selected portion over a range of a number of pixels. In various exemplary embodiments, the number of pixels is one. In various exemplary embodiments, the shift is performed in the X axis and/or the Y axis.

In various exemplary embodiments, a first one-dimensional correlation function is generated by shifting in one of the X axis and Y axis. The first correlation function is generated and analyzed using any of the techniques disclosed in incorporated 671 application, and/or in U.S. patent application Ser. Nos. 09/584,264, 09/921,711, 09/860,636, 09/921,889, and 09/987,162, incorporated herein by reference in their entireties for all their relevant teachings, to find a correlation peak and possibly to interpolate between the points around the correlation peak to determine the actual peak offset position. This determines a location in the one of the X axis and Y axis relative to an edge of the detection window 440. Next, using this location, shifting is performed in the other of the X axis and Y axis to generate a second one-dimensional correlation function.

In various exemplary embodiments, the third resolution measurement values for the first and second measuring axes 111 and 112 are determined at this point. In this case, based on the peak offset positions of the first and second correlation functions, two dimensional correlation functions are determined for the peak 2D location corresponding to those peak offset positions and for a number of locations in two dimensions around that 2D peak location, for example over a range corresponding to a few or several image pixels or in each direction.

In various exemplary embodiments, when quasi-random patterns are used, the estimate of the offset of the quasi-random pattern relative to the detector array along the first measuring axis is used in determining the offset of the detector array relative to the local datum along the first measuring axis. Similarly, the estimate of the offset of the quasi-random pattern relative to the detector array along the second measuring axis is used in determining the offset of the detector array relative to the local datum along the second measuring axis.

In various exemplary embodiments, a 2-dimensional correlation function is generated based on the shift of the selected portion in both the X axis and the Y axis. The 2-dimensional correlation function is analyzed to obtain a 2D peak location.

In various exemplary embodiments, the peak offset positions of the first and second correlation functions are sufficiently accurate such that only approximately four additional 2D locations around that 2D peak location are used to generate the additional correlation functions. In various exemplary embodiments, these four additional locations represent shifts of (0,−1), (−1,0), (0,1) and (1,0) from the 2D peak location, respectively. In various other exemplary embodiments, these four additional locations represent shifts of (−1,−1), (−1,1), (−1,1) and (1,1) from the 2D peak location, respectively.

As outlined above, in various exemplary embodiments, the correlation function is generated by comparing the captured image corresponding to the detection window 440 to a reference image selected to match the structure appearing in the detection window 440. In various exemplary embodiments, the reference image can be an actual image of a typical quasi-random pattern portion of the 2D scale 110 acquired through the readhead 126, such as the quasi-random pattern 412 of the 2D scale 410. Alternatively, it can be an actual or synthetic quasi-random image used to originally generate the 2d scale 110, or the like. The only requirement for the reference image is that the reference image has a quasi-random pattern corresponding to the one or more quasi-random patterns used for the 2D scale 110, of sufficient size to allow an adequate 2D correlation curve to be generated.

It should be appreciated that, if the readhead 126 is mounted with a yaw misalignment relative to the 2D scale 110, the actual images from the 2D scale 110 will be rotated relative to an ideally aligned reference image of the 2D scale 110. However, in general, such a limited image rotation due to misalignment will be consistent regardless of the position of the readhead 126 along the 2D scale 110. Therefore, such image rotations will create an error that is approximately the same at each position and therefore can be ignored in various exemplary embodiments.

In various other exemplary embodiments, the amount of rotational misalignment between an actual image and an ideally aligned reference image is determined, during a calibration procedure, using any known or later-developed rotational correlation method, or the like. The reference or actual images are then computationally rotated into alignment, prior to or during the signal processing that occurs during normal operation, to enhance the accuracy of correlation operations and the accuracy of position determinations. In yet other exemplary embodiments, the reference image is derived from an actual image including the consistent rotational misalignment. In this case, the reference image is inherently rotationally aligned with the subsequent actual images.

FIG. 9 illustrates a second exemplary embodiment of a 2D integrated absolute scale 500 corresponding to the 2D integrated scale pattern 300' shown in FIG. 5. As shown in FIG.

9, the 2D integrated scale 500 includes a plurality of the 2D quasi-random pattern portions 410, and a plurality of 2D code portions 530 arranged along both of the measuring axes 111 and 112.

The second exemplary embodiment of a 2D integrated absolute scale 500 shown in FIG. 9, relative to the first exemplary embodiment of a 2D integrated absolute scale 400 shown in FIG. 8, also includes a plurality of regions 517. In each region 517, a portion of the quasi-random pattern 412 that would otherwise be present, as in the first exemplary embodiment of a 2D integrated absolute scale 400 shown in FIG. 8, is omitted.

That is, each region 517 forms a break in the pattern of the one or more quasi-random patterns 412 in this second exemplary embodiment of the 2D integrated absolute scale 300. It should be appreciated that the regions 517 are distributed within the integrated absolute scale 500 such that at least one region 517 is guaranteed to be present within the detection window 440 and to extend fully across the height of the detection window 440 from the top edge 446 to the bottom edge 448 when the detection window 440 is positioned anywhere in the area of the 2D integrated absolute scale 500.

The second exemplary embodiment of a 2D integrated absolute scale 500 shown in FIG. 9 also uses a differently styled predetermined portion 520 and code portion 530. In particular, in the second exemplary embodiment of a 2D integrated absolute scale 500 shown in FIG. 9, the predetermined portion 520 is located to the left of the code portion 530.

As shown in FIG. 9, the predetermined portion 520 extends across the region 517. FIG. 9 also shows one exemplary embodiment of a pattern of code elements 432 and the spaces 434 in the predetermined portion 520 that create detectable patterns of transitions along the rows of the captured image, regardless of the particular pattern of code elements 432 and spaces 434 that might be present in an adjacent code portion. Accordingly, it should be appreciated that the location of the region 517 within the detection window 440 can be easily located in any row of the captured image within the detection window 440.

Thus, it should be appreciated that, by using the pattern of the 2D integrated absolute scale 500 shown in FIG. 9, the location of the region 517 within the detection window 440 along the first measuring axis 111, i.e., the X axis, can thus be determined by selecting and analyzing any one row of the captured image according to the foregoing discussion. Once that location of the region 517 is determined along the first measuring axis 111, the central column of pixels of the region 517 is known and can then be selected and scanned up and/or down to determine the location of the top and bottom edge of the 4 dark code elements 432 of the predetermined portion that appear within the region 517, since these code elements 432 correspond to the only dark pixels within the region 517. Furthermore, in various exemplary embodiments according to this invention, the X-Y intersection of either of these top or bottom edges with the central pixel row of the region 517 can serve to fulfill the functions previously described for the code position indicator and the local datum in the discussion of the first exemplary embodiment of a 2D integrated absolute scale 400. Thus, it should be appreciated that using the pattern of the 2D integrated absolute scale 500 shown in FIG. 9 allows a particularly fast and deterministic sequence of position determining operations.

As previously described, the local datum and the code portion 430 or 530 each have a predetermined relationship to the predetermined portion. Thus, once the 2D location of the predetermined portion 420 or 520 is determined, the location of the local datum 436 along each of the first and second measuring axes 111 and 112, and thus the second resolution distances $d_2$ and $d_3$, can readily be determined. Likewise, the code portions of the code portion 430 or 530 can be readily located and analyzed to determine the binary values appearing in that code portion 430 or 530. The deterministic operations outlined above can thus be used to determine the 2D absolute position of the detection window 440, and thus the readhead 126, to the 2D scale 110 to the second resolution at particularly high speed which also aids in determining the third resolution 2D absolute position at high speed, as previously described.

FIG. 10 illustrates a 2D portion of a third exemplary embodiment of a 2D integrated absolute scale pattern corresponding to the 2D integrated scale pattern 300' shown in FIG. 5. As shown in FIG. 10, the 2D integrated scale 600 includes a plurality of the 2D quasi-random pattern portions 410, and a plurality of 2D code portions 630 arranged along both of the measuring axes 111 and 112. In addition, the third exemplary embodiment of a 2D integrated absolute scale 600 shown in FIG. 10, also includes a plurality of regions 517 as previously described with respect to the second exemplary embodiment 500. The third exemplary embodiment of a 2D integrated absolute scale 600 shown in FIG. 10 also uses a differently styled code portion 630 and predetermined portion 620 is located to the left of the code portion 630. The code portion 630 and predetermined portion 620 function as previously described for code portion 530 and the predetermined portion 520, serving to allow high speed location of the code portion and the local datum in an image of the 2D integrated absolute scale 600.

As shown in FIG. 10, the plurality of 2D code portions 630 are configured as a relatively narrow region extending along the measuring axis 111. Alternatively, in various other exemplary embodiments, the code elements of the code portion 630 are distributed in relatively narrow regions that extend along the measuring axis 112, and in yet other embodiments along each of the measuring axes 111 and 112. In various exemplary embodiments, such relatively narrow configurations for the code portion 630 provides easier decoding of the code portions 630, and created larger uninterrupted blocks of the quasi-random pattern in a typical acquired current image, which simplified or enhances the correlation analysis operations in various exemplary embodiments.

Figure 11:
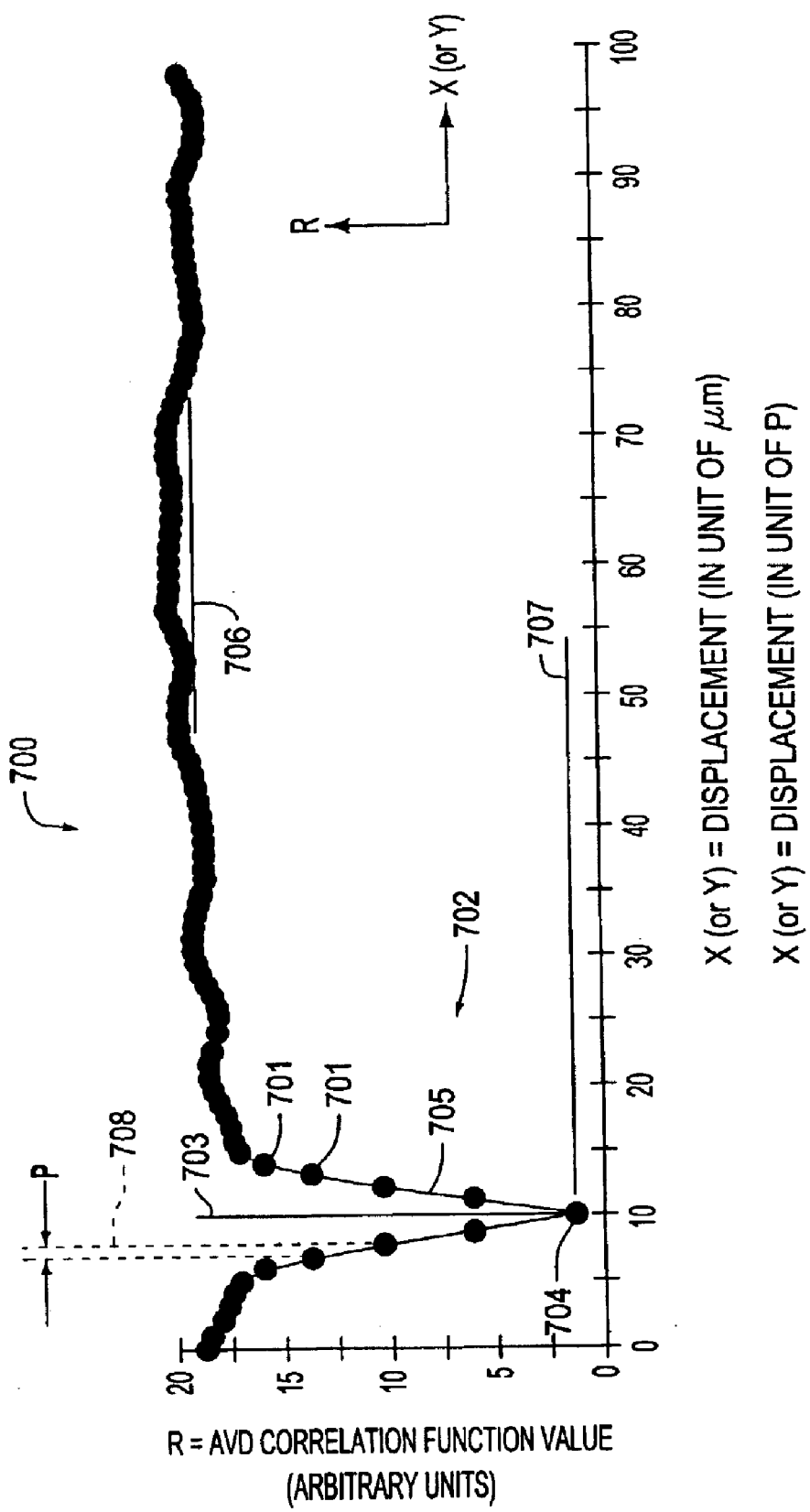
FIG. 11 is a graph illustrating the results of comparing first and second images by an absolute value of difference correlation function, when the images are offset at various pixel displacements.

The incorporated 671 application discloses one exemplary single-axis correlation technique that is usable in various methods and systems according to the present invention. That correlation technique is outlined here with reference to FIG. 11. FIG. 11 illustrates the results of comparing a first image and a second image in the form of a correlation function 700, along one (either) of the directions corresponding to the first and second measuring axes 111 and 112. An absolute difference is used in the correlation function:

$$R(p) = \sum_{q=1}^{N} \sum_{m=1}^{M} |I_1(m, q) - I_2(m + p, q)| \tag{2}$$

where:
p is a current offset value, in pixels;
R(p) is a correlation function value for the current offset value;
q is a current row (column);
m is a current pixel for the current row (column);

$I_1$ is an image value for the current pixel in the first image; and $I_2$ is an image value for the current pixel in the second image.

As shown in FIG. 11, the correlation function 700 includes a plurality of discrete correlation function value points 701 that are separated along the x-axis (or y-axis) by a predetermined offset increment corresponding to the pixel pitch P, as indicated by the distance 708.

Each correlation function value point 701 is generated by shifting the second image relative to the first image. The correlation function 700 of FIG. 11, which has correlation function values displayed in arbitrary units, exhibits an extremum of the true continuous correlation function 705 at the offset value where the image, or intensity, patterns in each of the first and second images best align.

Herein, the offset value in pixels associated with the extremum of a true continuous correlation function will be called the peak offset regardless of whether the underlying correlation function produces a peak or a trough, and the surface displacement corresponding to the peak offset will be called the peak displacement, or simply the displacement, regardless of whether the underlying correlation function produces a peak or a trough.

In FIG. 11, the extremum of the true continuous correlation function 705 occurs at a peak offset. The extremum of the true continuous correlation function 705 is indistinguishable from the extreme correlation function value point 704. However, in general, the extremum does not occur at an offset which is an integer multiple of the pixel spacing, and therefore does not precisely coincide with the extreme correlation function value point.

The systems and methods disclosed in the 671 application are, in various exemplary embodiments, used to estimate the x-coordinate value (or y-coordinate value) of the actual peak offset or peak displacement from a selected set of the correlation function value points 701. The x-coordinate value (or y-coordinate value) of the actual, or true, peak offset or peak displacement is indicated by a line 703 extending parallel to the R-axis and containing the point that is the extremum of the true continuous correlation function 705. Assuming that the true continuous correlation function 705 is symmetric in the region 702, any point on the line 703 is indicative of the x-coordinate value (or y-coordinate value) of the peak offset or peak displacement of the true continuous correlation function 705 at a sub-pixel accuracy. Numerous methods are disclosed in the 671 application for finding the x-coordinate value of a point located on the line 703 with sub-pixel accuracy.

In general, only the discrete correlation function value points 701 that have values that are substantially different than the noise level or average value 706 are used in the systems and methods of this invention. That is, only correlation function value points that lie within the region 702 are used. As previously discussed, it should be appreciated that because the estimated second resolution offset distances $d_2$ and $d_3$ are accurate within a few pixels or so, these distances can be used to select and/or narrow the range of offsets or spatial translation positions over which the plurality of discrete correlation function value points 701 need to be determined. The correlation function value of the extreme correlation function value point, indicated by the line 707, may be used in conjunction with the value of the noise level or average value 706 to normalize the correlation function value point values in the region 702, so that the correlation function value points can be selected according to a normalized value range, in some exemplary embodiments. In any case, this correlation technique or any other now known or later developed correlation technique, pattern-matching technique, template-matching technique, or the like, can be used to provide a high accuracy third resolution 2D absolute position measurement according to the principles of this invention. Alternative 1D and 2D correlation functions and methods usable according to the principles of the present invention are described in the incorporated 711 application.

Figure 12:
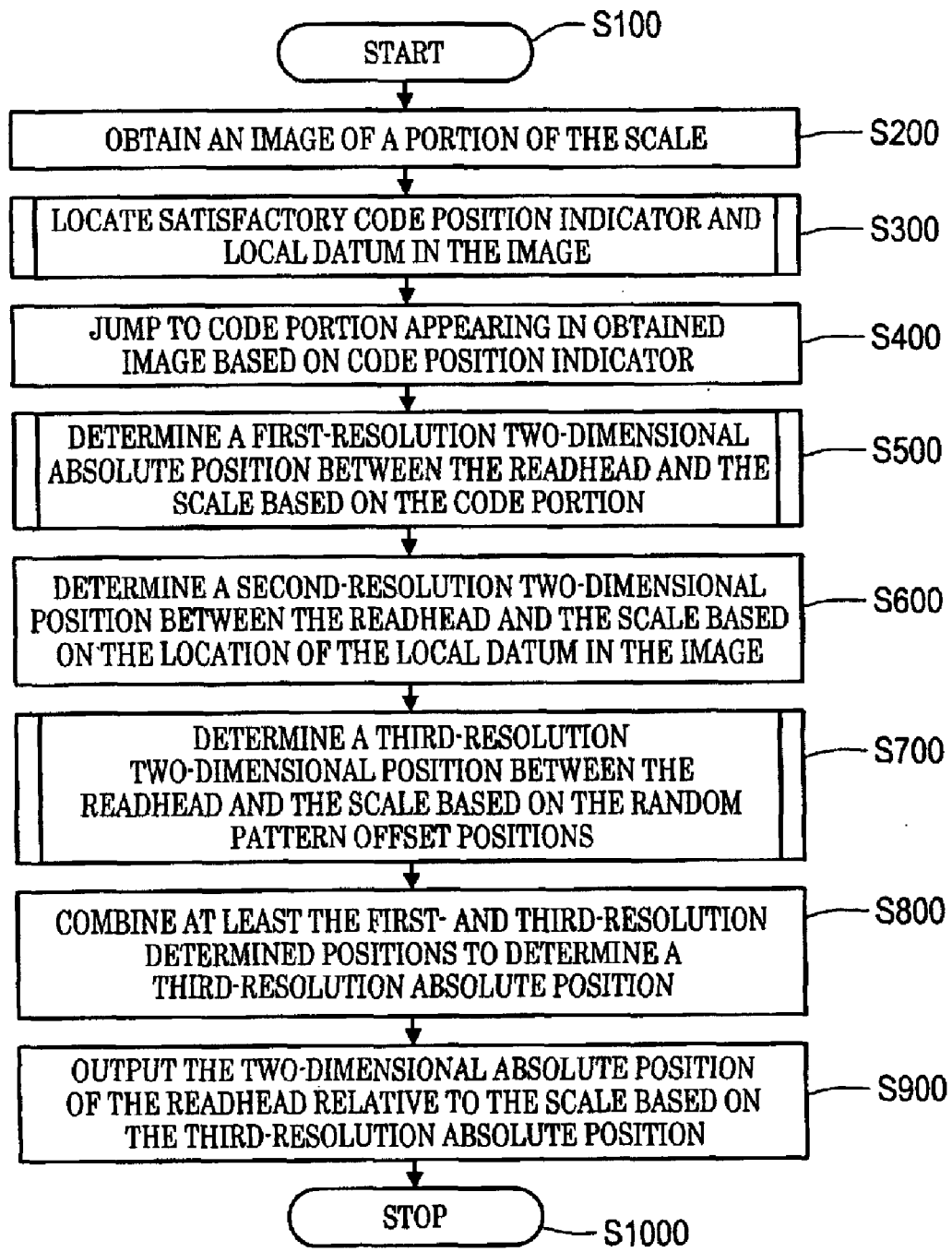
FIG. 12 is a flowchart outlining one exemplary embodiment of a method for determining the 2D absolute position of a readhead relative to a 2D integrated absolute scale according to this invention.

FIG. 12 outlines one exemplary embodiment of a method for determining a high-resolution 2D absolute position measurement between a readhead and a 2D scale according to this invention. Beginning in step S100, operation of the method continues to step S200, where an image of a portion of the 2D scale is obtained. Of course, this image of the portion of the 2D scale needs to include images of at least a portion of one or more quasi-random pattern portions and the equivalent of one or more code portions according to the principles of this invention. Then, in step S300, a location of a satisfactory code position indicator and a local datum is determined in the image. Operation then continues to step S400.

In step S400, based on the satisfactory code position indicator, the range of pixel locations corresponding to the code portion information or data of a code portion that appears in the image of the portion of the 2D scale obtained in step S200 is determined or located. Next, in step S500, a first-resolution 2D absolute position between the readhead and the 2D scale is determined based on the information contained in the range of the addresses or pixel locations corresponding to the determined or located code portion. Operation then continues to step S600.

In step S600, a second-resolution 2D position between the readhead and the scale is determined based on the location of the local datum associated with the identified code portion appearing in the obtained image. It should be appreciated that, in various exemplary embodiments, the local datum may appear or occur within a quasi-random pattern of the obtained image that is adjacent to the identified code portion. In contrast, in various other exemplary embodiments, the local datum appears within the identified code portion. Operation then continues to step S700.

As discussed above, step 600 is optional. This step may be omitted when the correlation function values and/or the correlation curve are created to directly determine the location of the projected image of the 2D scale 110 relative to the detection window 340 to a sub-pixel resolution.

It should be appreciated that, with respect to step S600, the second resolution position can be determined by determining the location of a local datum in the obtained image, relative to a reference position of the local datum which is implicit in the related signal processing operations. Any of the previously-described types of local datums may be used. Regardless of what feature or characteristic is used to define the local datum, in various exemplary embodiments, when the reference positions for the local datum are the edges of the obtained image, the distances of the local datum to the edges of the obtained image are determined by counting, along each of the measuring axes, the number of pixels along that measuring axis between the feature defining the local datum and the corresponding edge of the obtained image. However, it should be appreciated that there is generally expected to be some uncertainty, on the order of a few pixels in the pixel position of the local datum feature and thus in the distances $d_2$ and $d_3$ between the local datum feature and the edges of the obtained image. As previously described, in various exemplary embodiments, the second-resolution 2D position can be used to select and/or narrow the range of offsets or spatial translation positions over which a plurality of discrete correlation function value points need to be determined in the subsequent step S700.

In step S700, a third-resolution 2D absolute position between the readhead and the scale is determined based on one or more generated correlation curves. In various exemplary embodiments, the third-resolution 2D position between the readhead and the scale is based on a high resolution set of X and Y quasi-random pattern offset positions. Operation then continues to step S800.

In step S800, at least the first- and third-resolution 2D positions between the readhead and the scale are combined to generate a third-resolution 2D absolute measurement of the position between the readhead and the 2D scale corresponding to the obtained image. Then, in step S900, the 2D third resolution absolute position of the readhead relative to the scale that is determined based on the combined measurements is output. Operation then continues to step S1000, where operation of the method stops.

Figure 13:
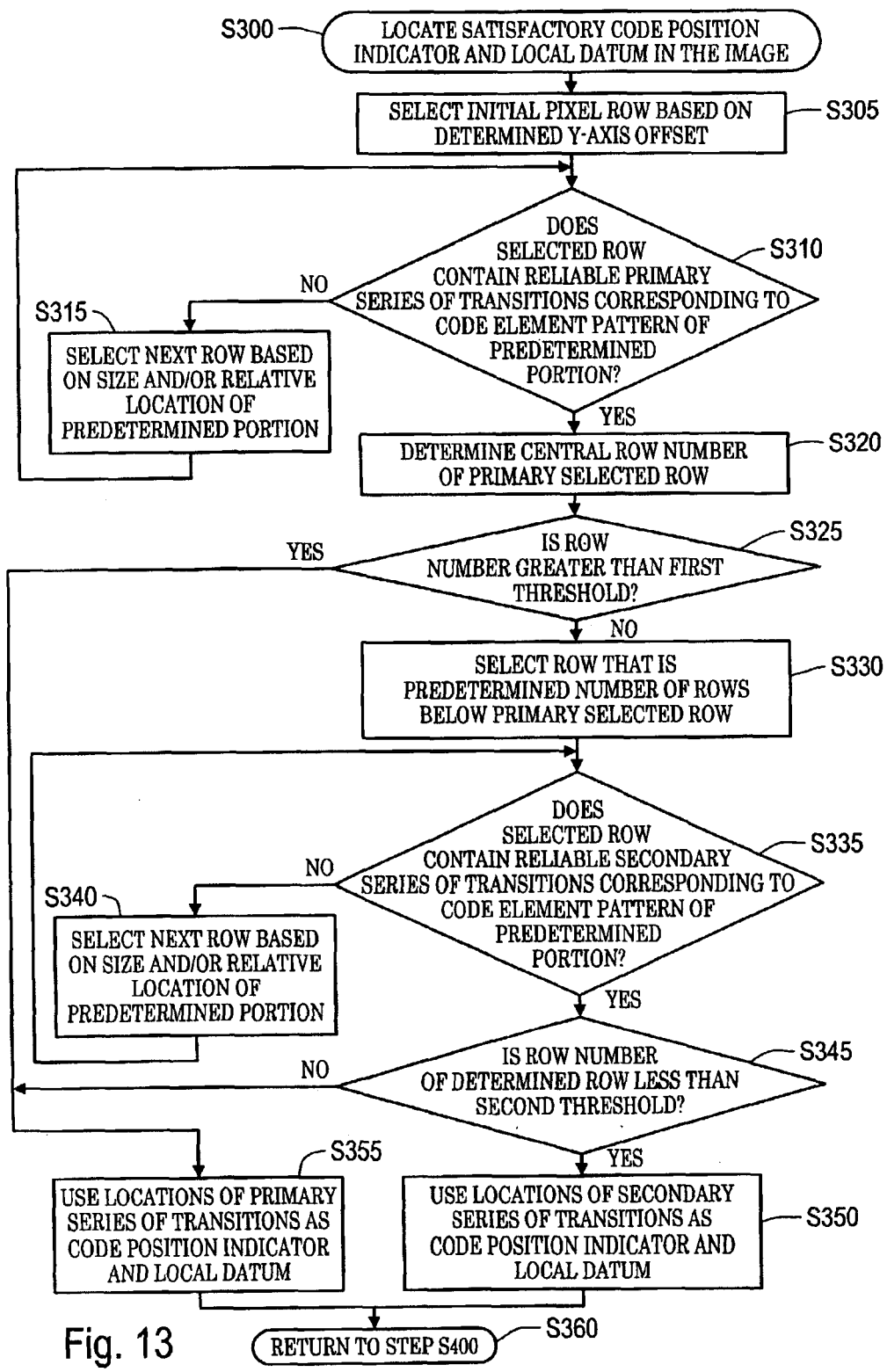
FIG. 13 is a flowchart outlining in greater detail a first exemplary embodiment of a method for locating a satisfactory code position indicator and local datum according to this invention that is usable with the exemplary embodiment shown in FIG. 8.

FIG. 13 is a flowchart outlining in greater detail a first exemplary embodiment of a method for determining the location of a satisfactory code position indicator and a local datum in the image according to this invention. This first exemplary embodiment of the method is particularly well-suited for use with the exemplary embodiment of the 2D scale pattern 300' shown in FIG. 8. As shown in FIG. 13, operation begins in step S300, and continues to step S305, where an initial pixel row is selected. Then, in step S310, a determination is made whether the selected row contains a reliable primary series of transitions that correspond to the pattern of code elements and empty code zones that occur in the predetermined portion. If so, operation jumps to step S320. Otherwise, operation continues to step S315, where a next row is selected based on the size and/or location of the code zones of the predetermined portion along the second measuring axis. Operation then returns to step S310.

In step S320, a row number for the primary series of transitions, i.e., the primary row selected in step S310, is determined. In various exemplary embodiments, a central row of the code elements of the primary series of transitions is found and used as the row number, as previously described. Next, in step S325, a determination is made whether the determined row number for the primary series of transitions is greater than a first threshold value. If so, operation jumps to step S355. Otherwise, operation continues to step S330, where a row is selected that is a predetermined number of rows below the primary selected row and that is certainly above the next lower predetermined portion in the image. Then, in step S335, a determination is made whether the selected row contains a reliable secondary series of transitions that correspond to the pattern of code elements and empty code zones that occur in the predetermined portion. If so, operation jumps to step S345. Otherwise, operation continues to step S340, where a next row is selected based on the size and/or location of the code zones of the predetermined portion along the second measuring axis. Operation then returns to step S335.

In step S345, a determination is made whether the determined row number for the secondary selected row is greater than a second threshold value. If so, operation jumps to step S355. Otherwise, operation continues to step S350, where the location of the second series of transitions is used as the satisfactory code position indicator and local datum. Operation then jumps to step S360.

In contrast, in step S355, the location of the primary series of transitions is used as the satisfactory code position indicator and local datum. Operation continues to step S360, where operation returns to step S400.

Figure 14:
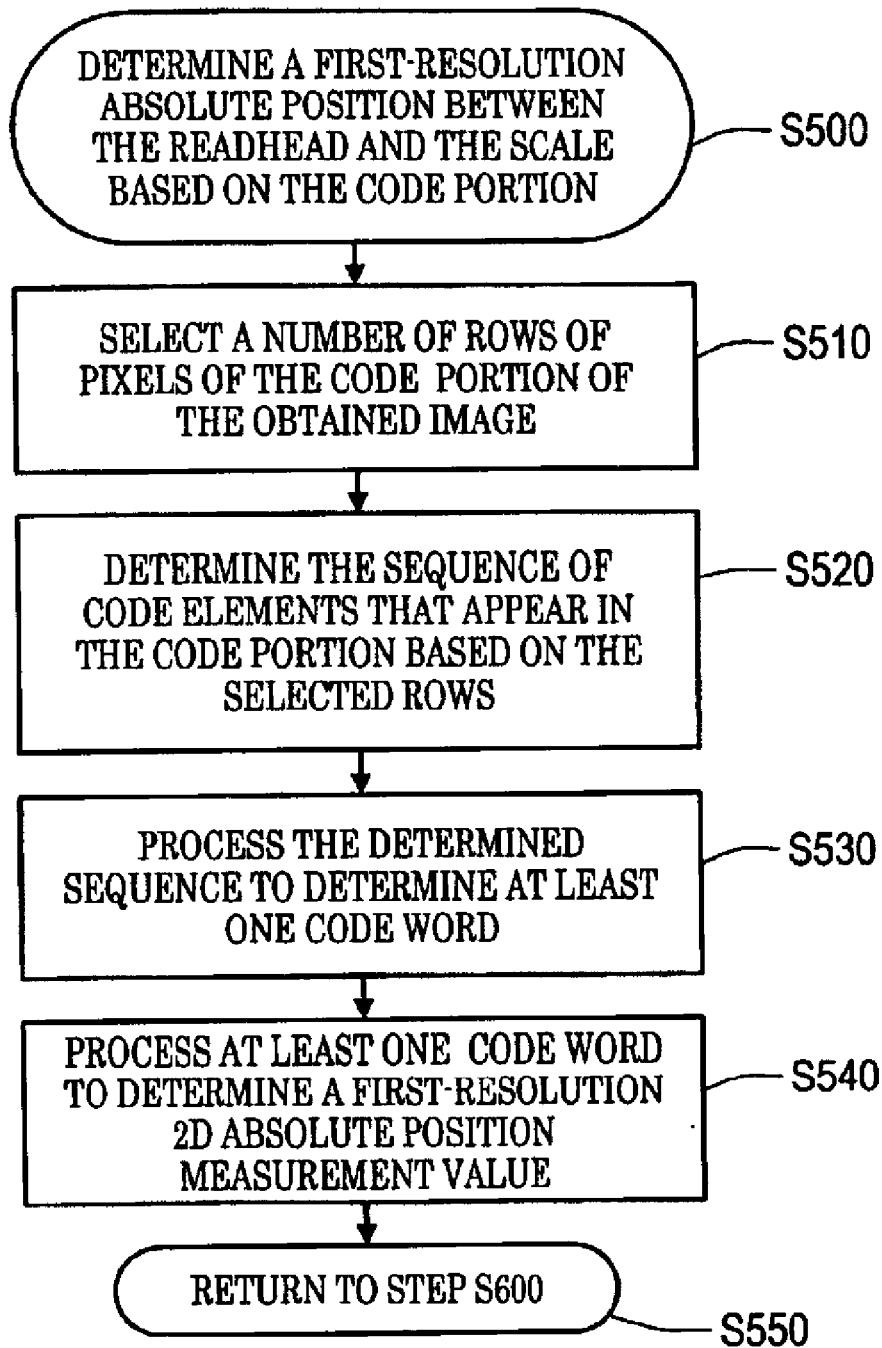
FIG. 14 is a flowchart outlining in greater detail one exemplary embodiment of a method for determining the 2D absolute position of the readhead relative to a 2D integrated absolute scale to a first resolution based on the code of a code portion of the 2D absolute scale according to this invention.

FIG. 14 is a flowchart outlining in greater detail one exemplary embodiment of the method of step S500 for determining the 2D absolute position of the readhead to the 2D integrated absolute scale to a first 2D resolution based on the identified code portion code portion. As shown in FIG. 14, operation of the method begins in step S500, and continues to step S510, where a number of rows of pixels of the code portion in the obtained image are selected. Then, in step S520, based on the selected rows of pixels of the code portion code elements, the sequence of code elements of that code portion is analyzed. In general, this comprises analyzing the sequence of the relatively light and dark pixels, or the intensity transitions between the relatively light and dark pixels, that occur within the selected one or more rows. Operation then continues to step S530.

In step S530, the analyzed sequence of code elements is processed to determine one or more code words that can be used to determine the first-resolution 2D absolute position measurement values along each of the first and second measuring axes. It should be appreciated that, in various exemplary embodiments, the coded scale markings define a binary code word where the dark pixels correspond to one of the binary values and the light pixels correspond to the other of the binary values. Of course, it should be appreciated that non-binary coding schemes, such as trinary or higher-ordered schemes, can be used.

Next, in step S540, the one or more code words are processed to determine a pair of first resolution 2D absolute position measurement values that indicate, to a first resolution, the portion and/or 2D position of the scale in the obtained image, and thus the position of the 2D scale relative to the readhead, along each of the first and second measuring axes. Operation then continues to step S550, where operation of the method returns to step S600.

It should be appreciated that, in various exemplary embodiments, the one or more code words are converted into the first resolution position measurement values using the one or more code words as one or more input addresses to a lookup table. The output of the lookup table, based on the one or more addresses indicated by the one or more code words, indicates the corresponding first resolution position measurement values. In contrast, in various other exemplary embodiments, the one or more code words define a number of first resolution periods $d_0$ and $d_1$ between an origin point on the scale and a current position of the readhead relative to the scale along each of the measuring axes. Thus, the first resolution periods $d_0$ and $d_1$ are each multiplied by the value of the code word or number to obtain the first-resolution distance measurement value along the corresponding measuring axis. In various other exemplary embodiments, each of two code words defines a number that is itself the first resolution distance measurement value along one of the measuring axes.

Figure 15:
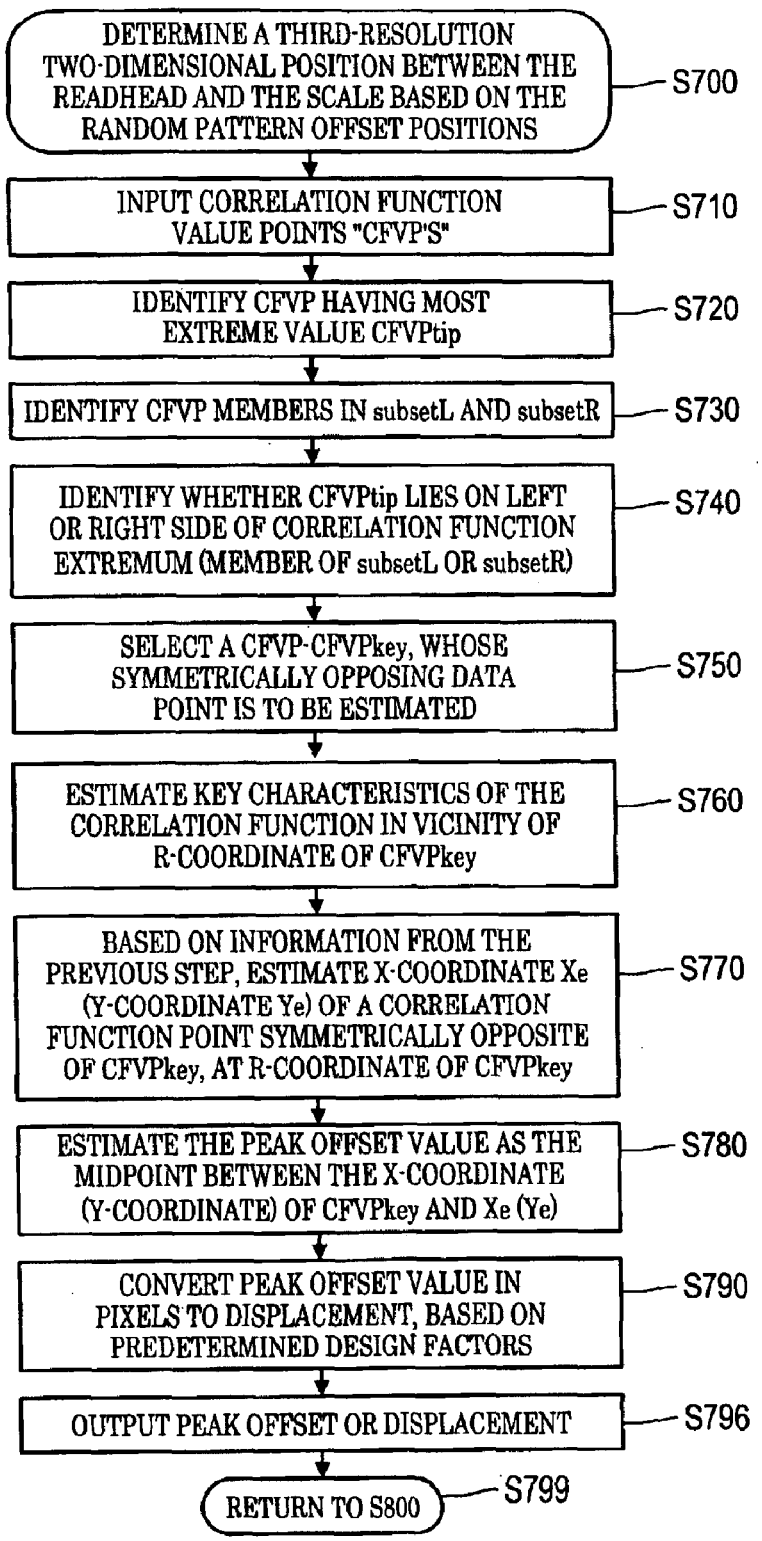
FIG. 15 is a flowchart outlining in greater detail one exemplary embodiment of a method for determining the 2D absolute position of a readhead relative to a 2D integrated absolute scale to a third resolution according to this invention.

FIG. 15 is a flowchart outlining in greater detail one exemplary embodiment of a single-axis method for determining peak offset positions that is usable according to the principles of this invention in the operations for determining the third-resolution absolute position. FIG. 15 generally corresponds to FIG. 11 herein, and also corresponds to methods described in greater detail in the incorporated 671 application. Beginning in step S700, control proceeds to step S710, where a set of correlation function value points are input corresponding to the current one of the measuring axes 111 and 112 (x-axis and y-axis) that is to be currently analyzed. These points can include, but are not limited to, the correlation function value points in the vicinity of the correlation function peak or trough.

Next, in step S720, the extreme correlation function value point CFVPtip is identified from the input set of correlation function value points. In various exemplary embodiments the extreme correlation function value point CFVPtip is identified, for example, by determining the approximate noise level or average correlation function value based on all the correlation function value points in the set, and then by determining the correlation function value point which has the correlation function value farthest from the noise level or average correlation function value. In FIG. 11, the approximate noise level or average correlation function value is exemplified by the value indicated by the line 706. In various exemplary embodiments, the extreme correlation function value point CFVPtip is exemplified by the correlation function value point 704 in FIG. 11.

Then, in step S730, a pair of x-axis (y-axis) correlation function value point subsets, subsetL and subsetR, are identified from the input set of x-axis (y-axis) correlation function value points. In various exemplary embodiments, the x-axis (y-axis) correlation function value point subset subsetL comprises a limited subset of the input x-axis (y-axis) correlation function value points with offsets, or x-coordinate (y-coordinate) values, to the left of the extreme correlation function value point CFVPtip. In various exemplary embodiments, the x-axis (y-axis) correlation function value point subset subsetR comprises a limited subset of the input x-axis (y-axis) correlation function value points with offsets, or x-coordinate (y-coordinate) values, to the right of the extreme correlation function value point CFVPtip. In various exemplary embodiments, the members of each limited subset subsetL and subset R may be identified by selecting a predetermined number of x-axis (y-axis) correlation function value points adjacent to the extreme correlation function value point CFVPtip on the appropriate side.

Alternatively, in various exemplary embodiments, the members of each limited subset subsetL and subsetR may be identified by selecting, on the appropriate side of the extreme correlation function value point CFVPtip, the x-axis (y-axis) correlation function value points with correlation values in a predetermined normalized range between the value of the extreme x-axis (y-axis) correlation function value point CFVPtip and the previously discussed approximate noise level or average correlation function value. Control then continues to step S740.

In step S740, a determination is made whether the extreme correlation function value point CFVPtip lies to the left side or to the right side of the extremum of the true x-axis (y-axis) correlation function, by any of various known or later-developed methods. Next, in step S750, an x-axis (y-axis) correlation function value point CFVPkey is selected. In later steps, an x-axis (y-axis) correlation function value point will be estimated which is intended to be symmetrically located about the extremum, or peak offset, of the true continuous x-axis (y-axis) correlation function relative to the x-axis (y-axis) correlation function value point CFVPkey. In various exemplary embodiments, the x-axis (y-axis) correlation function value point CFVPkey is selected from the subset, subsetL or subsetR, with the fewest members, or as otherwise indicated or suggested in the various exemplary embodiments of the systems and methods according to this invention described herein. Operation then continues to step S760.

In step S760, the true continuous x-axis (y-axis) correlation function is characterized, or estimated, over a portion of the true continuous x-axis (y-axis) correlation function which is generally symmetrically located about the extremum, or peak offset, of the true continuous x-axis (y-axis) correlation function relative to the x-axis (y-axis) correlation function value point CFVPkey. It is only necessary to characterize, or estimate, the true continuous x-axis (y-axis) correlation function to the extent required to estimate an x-axis (y-axis) correlation function value point that is symmetrically located about the extremum, or peak offset, of the true continuous x-axis (y-axis) correlation function relative to the x-axis (y-axis) correlation function value point CFVPkey. Various exemplary embodiments of the systems and methods are disclosed in the incorporated 671 application for estimating the desired portion of the true continuous x-axis (y-axis) correlation function. Next, in step S770, the value $x_e$ ($y_e$) of an x-axis (y-axis) point symmetrically located about the extremum, or peak offset, of the true continuous x-axis (y-axis) correlation function relative to the x-axis (y-axis) correlation function value point CFVPkey is estimated. Various exemplary embodiments of the systems and methods are disclosed in the incorporated 671 application for estimating the value $x_e$ ($y_e$) of an x-axis (y-axis) point symmetrically located about the extremum, or peak offset, of the true continuous x-axis (y-axis) correlation function relative to the x-axis (y-axis) correlation function value point CFVPkey. Control then continues to step S780.

In step S780, the x-axis (y-axis) peak offset value is estimated as the offset, or x-coordinate (y-coordinate) value, of the symmetry point, or mid-point, between the previously determined coordinate value of the x-axis (y-axis) correlation function value point CFVPkey and $x_e$ ($y_e$). Then, in step S790, the x-axis (y-axis) peak offset value is converted to an x-axis (y-axis) displacement according to predetermined design factors. Next, in step S796, the previously determined x-axis (y-axis) peak offset or displacement is output with sub-pixel resolution. Finally, in step S799, operation returns to step S800. It should be understood that in various exemplary embodiments according to this invention, the steps S710–S790 are repeated or performed concurrently for each of the measuring axes 111 and 112 (x-axis and y-axis) to be analyzed, and the steps S796 and S799 are performed concurrently for both axes in such embodiments.

Figure 16:
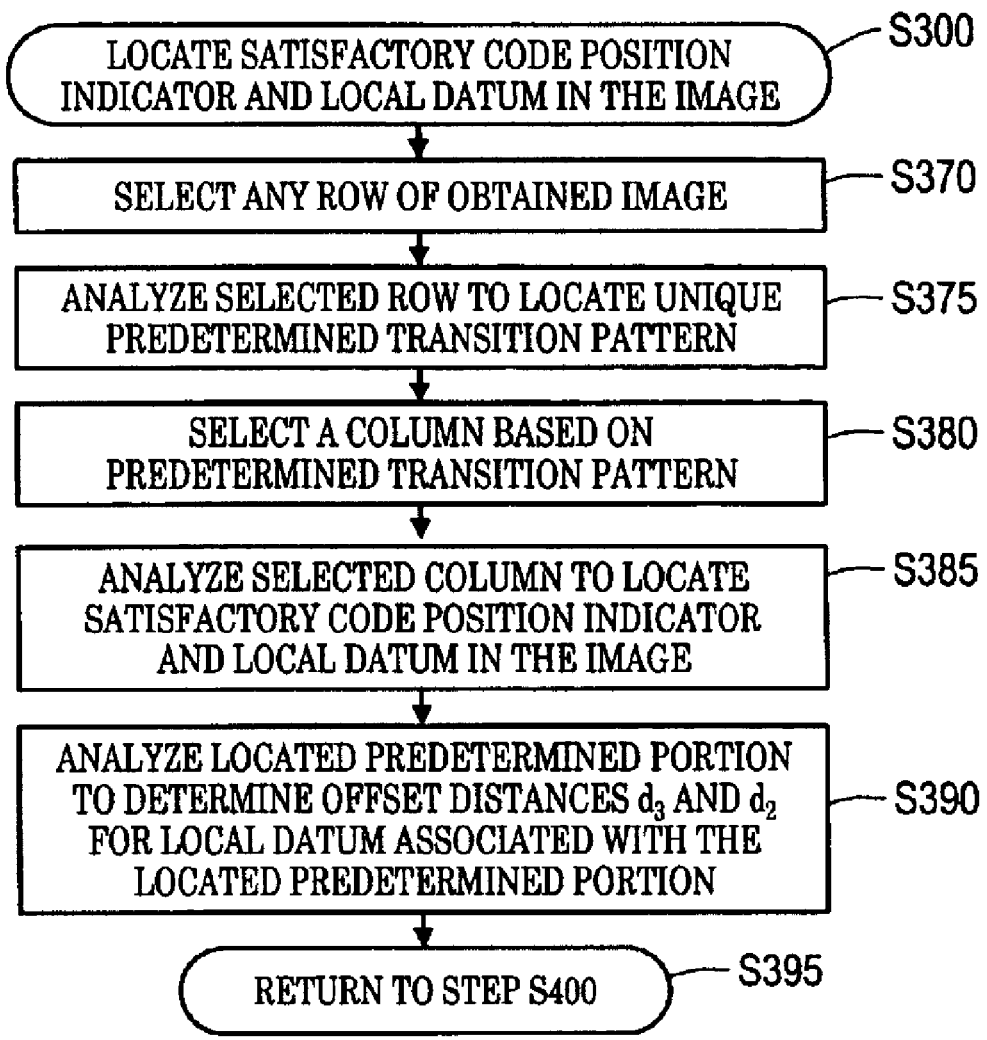
FIG. 16 is a flowchart outlining in greater detail a second exemplary embodiment of a method for locating a satisfactory code position indicator and local datum according to this invention that is usable with the exemplary embodiment shown in FIG. 9.

FIG. 16 is a flowchart outlining in greater detail a second exemplary embodiment of a method, which is particularly usable with the exemplary embodiments of the 2D scale patterns 500 and 600 shown in FIGS. 9 and 10, for determining the location of a satisfactory code position indicator and a local datum in the image according to this invention. As shown in FIG. 16, the method begins in step S300 and continues to step S370, where any row of the obtained image is selected. Then, in step S375, the selected row is analyzed to locate a region that gives rise to a unique predetermined transition pattern, or any member of a set of unique predetermined transition patterns, at least one of which is present in every row of the image. In various exemplary embodiments, such a set of unique predetermined transition patterns includes a transition pattern corresponding to contiguous "missing" or extreme-valued scale feature areas. Next, in step S380, based on the located predetermined transition pattern, a column is selected based on the location of the located predetermined transition pattern. Operation then continues to step S385.

In step S385, the selected column is analyzed to locate the position of a satisfactory code position indicator and local datum that can be certainly located based on analyzing the selected column. Next, in step S390, the location of the local datum is analyzed to determine the second resolution offset position distances $d_2$ and $d_3$ in the image along each of the first and second measuring axes for the local datum associated with the located predetermined portion. Operation then continues to step S395, where operation returns to step S400.

Figure 17:
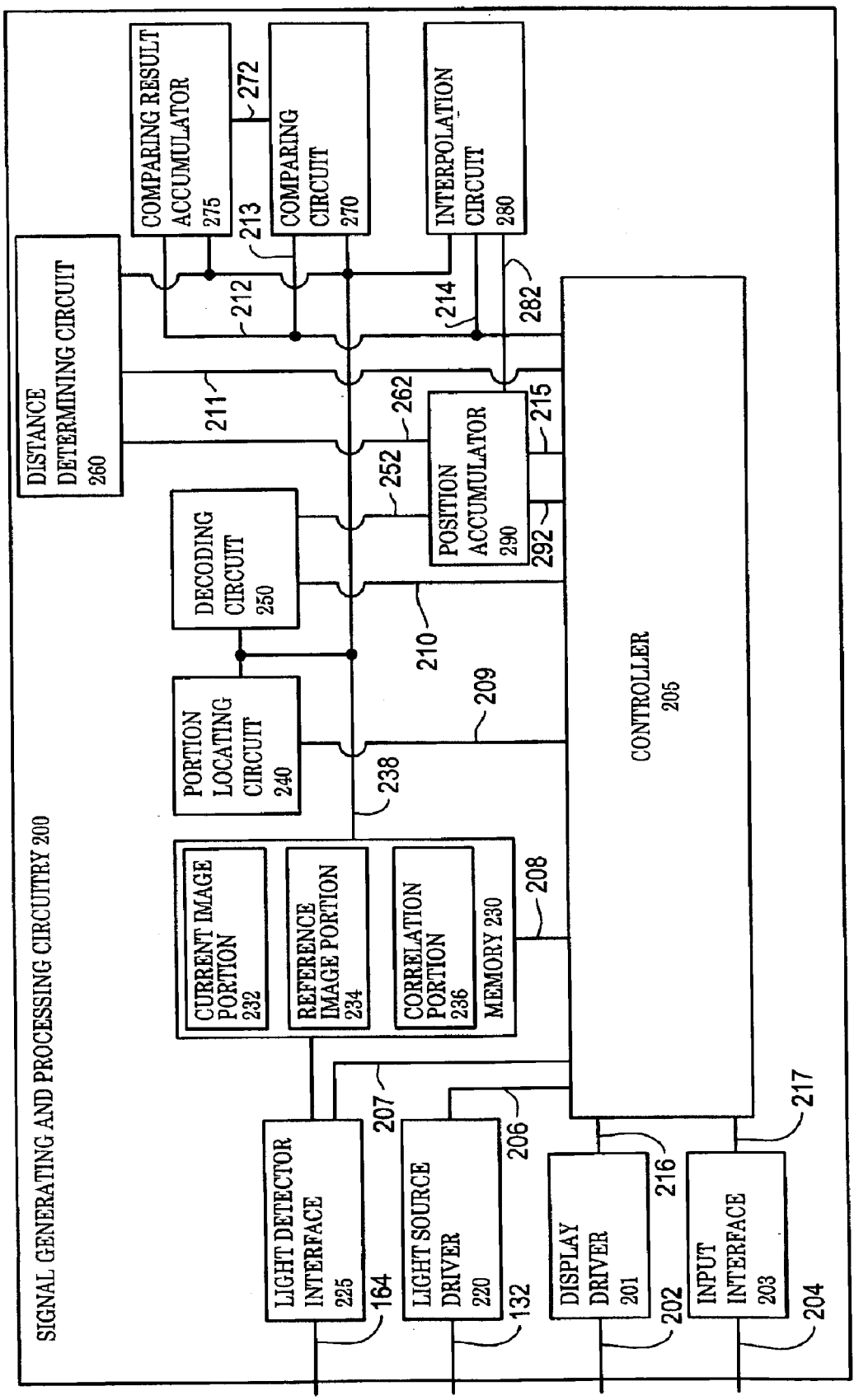
FIG. 17 is a block diagram outlining in greater detail one exemplary embodiment of the signal generating and processing circuitry of FIG. 1 usable to obtain a 2D absolute position measurement from the 2D integrated absolute scale according to this invention.

FIG. 17 is a block diagram outlining in greater detail one exemplary embodiment of the signal generating and processing circuitry 200 shown in FIG. 1. As shown in FIG. 17, the signal generating and processing circuitry 200 includes a controller 205, a light source driver 220, a light detector interface 225, a memory 230, a portion locating circuit 240, a decoding circuit 250, a distance determining circuit 260, a comparing circuit 270, a comparison result accumulation 275, an interpolation circuit 280, a position accumulator 290, a display driver 201 and an optional input interface 203.

The controller 205 is connected to the light source driver 220 by a signal line 206, to the light detector interface 225 by a signal line 207, and to the memory 230 by a signal line 208. Similarly, the controller 205 is connected by signal lines 209–215 to the portion locating circuit 240, the decoding circuit 250, the distance determining circuit 260, the comparing circuit 270, the comparison result accumulator 275, the interpolation circuit 280 and the position accumulator 290, respectively. Finally, the controller 205 is connected to the display driver 201 by a signal line 216 and, if provided, to the input interface 203 by a signal line 217. The memory 230 includes a current image portion 232, a reference image portion 234 and a correlation portion 236.

In operation, the controller 205 outputs a control signal over the signal line 206 to the light source driver 220. In response, the light source driver 220 outputs a drive signal to the light source 130 over the signal line 132. Subsequently, the controller 205 outputs a control signal to the light detector interface 225 and to the memory 230 over the signal lines 207 and 208 to store the signal portions received over the signal line 164 from the light detector 160 corresponding to each of the image elements 162 into the current image portion 232. In particular, the image values from the individual image elements 162 are stored in a 2D array in the current image portion 232 corresponding to the positions of the individual image elements 162 in the array 166.

After the obtained or current image is stored in the current image portion 232, the current image is output over a signal line 238 to the portion locating circuit 240. Then, based on control signals output from the controller 205 over the signal lines 209, the portion locating circuit 240 analyzes one or more rows and one or more columns of the obtained image stored in the current image portion 232 to locate the predetermined portion 320 (or 520 or 620) and/or the code portion 330 (or 530 or 630). In particular, depending on the particular one of the structures shown in FIGS. 8–10 that is implemented in the 2D scale 110, this analysis may use the corresponding technique outlined above with respect to FIGS. 8–10. Thus, in various exemplary embodiments, the portion locating circuit 240 may be operated in conjunction with the comparing circuit 270 and the comparison result accumulator 275. Then, based on control signals from the controller 205 over the signal line 210, the decoding circuit 250 inputs, from the current image portion 232 of the memory 230, the code portion, as located by the portion locating circuit 240, that appears within the obtained image.

The decoding circuit 250 then converts the pattern of bright and dark pixels in the located portion of the obtained image into one or more code words and converts the one or more code words into a pair of first resolution absolute position measurement values using one of the various techniques outlined above. The decoding circuit 250 outputs these first resolution absolute position measurement values to the position accumulator 290 over a signal line 252.

Next, based on the predetermined portion or code portion located by the portion locating circuit 240, the controller 205 outputs control signals over the signal line 211 to the distance determining circuit 260. In response, the distance determining circuit 260 inputs the all or part of the obtained image including at least the reference location for the local datum, such as the edges of the obtained image and the portion of the obtained image which is required in order to determine the location of the local datum from the current image portion 232 of the memory 230. The distance determining circuit 260 then analyzes this input portion of the obtained image to determine the second resolution distance measurement values for the 2D position of the readhead relative to the 2D scale based on the distances of the local datum to the corresponding reference positions for the local datum. The distance determining circuit 260 outputs these second resolution distance measurement values over a signal line 262 to the position accumulator 290.

Then, the controller 205 outputs a signal on the signal line 209 to the comparing circuit 270 to implement the appropriate correlation techniques outlined above with respect to FIGS. 8–11 and 15, or the like. In various exemplary embodiments, the various one-dimensional correlation curves or correlation function values for the appropriate offsets of the appropriate row and column portions are determined. Alternatively, in various exemplary embodiments, various two-dimensional correlation functions or correlation function values for the appropriate offsets of the appropriate row and column portions are determined. Additionally, as indicated above with respect to operation related to the exemplary scale shown in FIG. 8, in various exemplary embodiments correlation function values will be created by the controller 205 operating the comparing circuit 270 and the comparison result accumulator 275 in conjunction with the controller 205 operating the portion locating circuit to locate the appropriate row and column portions, as outlined above with respect to FIG. 8.

In response to the control signals from the controller 205 to generate a particular one of the one or more correlation curves or correlation function values to be generated for each appropriate axis, the comparing circuit 270 inputs an image value for a particular pixel from the corresponding portion of the current image stored in the current image portion 232 over the signal line 238 and inputs the image value for the corresponding pixel, based on the current offset, from the appropriate reference image stored in the reference image portion 234 over the signal line 238. The comparing circuit 270 then applies a correlation algorithm to determine a comparison result. Any appropriate correlation technique, known or later-developed, can be used by the comparing circuit 220 to compare the current image stored in the current image portion 232 with the reference image stored in the reference image portion 234 on a pixel-by-pixel basis based on the current offset. The comparing circuit 270 outputs the comparison result on a signal line 272 to the comparison result accumulator 275 for the current correlation offset.

Once the comparing circuit 270 has extracted and compared the image value for each of the image elements 162 from the current image portion 232 for the particular correlation curve or correlation function values and compared them to the corresponding image values stored in the reference image portion 234, and applied the correlation technique and output the comparison result to the comparison result accumulator 275, the value stored in the comparison result accumulator 275 defines the correlation value, corresponding to the current 2D, or X or Y, offset, in predetermined units. The controller 205 then outputs a signal over the signal line 213 to the comparison result accumulator 275 and to the memory 230 over the signal line 208. As a result, the correlation value result stored in the comparison result accumulator 275 is output and stored in the correlation portion 236 of the memory 230 at a location corresponding to the current 2D, or X or Y, offset.

The controller 205 then outputs a signal on the signal line 213 to clear the result accumulator 275. Once all of the comparisons for all of the desired offsets between the current image stored in the current image portion 232 and the reference image stored in the reference image portion 234 for the particular correlation curve or correlation function values have been performed by the comparing circuit 270, and the results accumulated by the comparison result accumulator 275 and stored in the correlation portion 236 under control of the controller 205, the controller 205 outputs a control signal over the signal line 214 to the interpolation circuit 280 and/or control signal over the signal lines 209 to the portion locating circuit 240.

For the 2D correlation curve that is generated by the comparing circuit 270 and the comparison result accumulator 275, the stored 2D correlation curve stored in the correlation portion 236 of the memory 230 is then output, under control of the controller 205, to the interpolation circuit 280. That is, the interpolation circuit 280 inputs the correlation results stored in the correlation portion 236 over the signal line 238 for the 2D correlation curve or correlation function values, and interpolates using selected ones of the correlation function value points in the vicinity of the peak/trough of the correlation function to determine the peak offset value or image displacement value with sub-pixel resolution in the X and Y directions. The interpolation circuit 280 then outputs, under control of the signal over the signal line 214 from the controller 205, the determined subpixel third resolution measurement value on a signal line 282 to the position accumulator 290.

The interpolation circuit 280 uses any known or later developed technique, such as any one of the techniques disclosed in the incorporated 671 patent, to find the actual location of the selected peak of the 2D correlation function or correlation function values to a subpixel resolution. This subpixel resolution incremental offset position information is output by the interpolation circuit 280 over the signal line 282 to the position accumulator 290.

The position accumulator 290 combines the 2D position or distance measurement values output by each of the decoding circuit 250, the distance determining circuit 260 and interpolation circuit 280 to generate a third-resolution 2D absolute position measurement indicative of the position of the readhead relative to the scale. The position accumulator 290 outputs this 2D absolute position measurement to the controller 205 over the signal line 292. The controller 205 then outputs the determined absolute position measurement over a signal line 216 to a display driver 201. The display driver 201 drives a display (not shown) by outputting control signals over a signal line 202 to output the determined absolute position measurement.

In response, the controller 205 may output the updated 2D position values to the display driver 201, if provided, over the signal line 217. The display driver 201 then outputs drive signals over the signal line 202 to the display device 107 to display the current displacement value.

One or more signal lines 204, if provided, allow an interface between an operator or a cooperating system and the controller 210. If provided, the input interface 203 may buffer or transform the input signals or commands and transmit the appropriate signal to the controller 205.

It should be appreciated that the foregoing discussion emphasizes scales 110 where each of the code portions 330 (and 530 and 630) have a characteristic extent along the measuring axis direction 112 and each of the quasi-random pattern portions 310 have a characteristic extent along the measuring axis direction 112. However, in various other embodiments, the extents may vary within one or more quasi-random pattern portions 310 and/or one or more code portions 330. Nevertheless, in such cases, the code elements of each code portion 330 must still be indicative of a measurement value of a local datum, even though the local datums will not necessarily occur periodically along the scale.

In various ones of the exemplary embodiments described above the scale 110 is a planar member. However, it should be appreciated that, in various other exemplary embodiments, the scale 110 is a cylindrical member having an axis of rotation, or at least defines a portion of a cylindrical surface that defines a cylinder axis. In this case, two-dimensional integrated scale patterns according to this invention are applied to the cylindrical scale 110 such that one of the first and second measuring axes 111 and 112 is parallel to the cylinder axis, while the other of the first and second measuring axes 111 and 112 lies along the circumference of the cylindrical member or surface. Thus, a two-dimensional integrated scale pattern 300 according to this invention can be used to establish the absolute position of a readhead with respect to a cylindrical surface.

It should also be appreciated that, while various exemplary embodiments of the invention have been illustrated and described, a wide variety of alternative codes and detection schemes may be used for the code portions, and a wide variety of alternative hardware and software schemes are applicable to detect the location of the quasi-random patterns relative to the readhead to provide the third-resolution measurement value according to the principles of this invention. It should also be appreciated that, primarily for the purpose of clear and simple description in the foregoing discussion, various operations and features have been described with reference to one or the other of the X axis and Y axis. However, the various operations and features described in relation to any axis herein may just as well be applied in various combinations to other axes in various embodiments according to this invention. Thus, it should be appreciated these and other various changes can be made to the various exemplary embodiments of the invention that have been illustrated and described herein without departing from the spirit and scope of the invention.

What is claimed is:

1. An absolute two-dimensional position sensing device usable to measure a position of a first member with respect to a second member along first and second measuring axes, the absolute two-dimensional position sensing device including a readhead and a scale, the scale including a two-dimensional integrated scale pattern extending along the first and second measuring axes, the two-dimensional integrated scale pattern comprising:

a plurality of quasi-random pattern portions, each quasi-random pattern portion extending along the first and second measuring axes and having first and second dimensions, and each quasi-random pattern portion comprising at least a portion of at least one quasi-random pattern; and a plurality of code portions distributed within the two-dimensional integrated scale pattern and spaced apart along a first direction by substantially the first dimension and spaced apart along a second direction by substantially the second dimension, each code portion comprising a plurality of code elements defining at least one code word, the at least one code word usable to identify a measurement value of a local datum along each of the first and second measuring axes;

wherein the plurality of quasi-random pattern portions and the plurality of code portions are configured such that a detection window of the readhead that extends along each of the first and second directions includes a number of code elements sufficient to define at least one code word, the defined at least one code word usable to identify the measurement value of a corresponding local datum along the first and second measuring axes, regardless of the position of the detection window within the two-dimensional integrated scale pattern.

2. The two-dimensional absolute position sensing device of claim 1, wherein a predetermined portion of each of the plurality of code portions comprises a pattern that is the same for each of the plurality of code portions.

3. The two-dimensional absolute position sensing device of claim 1, wherein the at least a portion of at least one quasi-random pattern comprises one of a) a portion of single quasi-random random pattern that is larger than random pattern portion, b) a plurality of similar quasi-random random patterns that are smaller than the random pattern portion, c) a plurality of different quasi-random random patterns that are smaller than the random pattern portion and d) a single entire quasi-random pattern that is the same size as the random pattern portion.

4. The two-dimensional absolute position sensing device of claim 1, wherein the at least a portion of at least one quasi-random pattern comprises a pattern that is the same for a plurality of the quasi-random pattern portions.

5. The two-dimensional absolute position sensing device of claim 4, wherein the at least a portion of at least one quasi-random pattern comprises a pattern that is the same for all of the quasi-random pattern portions.

6. The two-dimensional absolute position sensing device of claim 1, wherein a percentage of an area of the detection window occupied by the code portions is at most 20%, regardless of the position of the detection window along the first and second measuring axes relative to the at least one quasi-random pattern and the plurality of code portions.

7. The two-dimensional absolute position sensing device of claim 6, wherein the percentage is at most 10%.

8. The two-dimensional absolute position sensing device of claim 1, wherein the two-dimensional integrated scale pattern comprises at least one diffusely reflecting surface.

9. The two-dimensional absolute position sensing device of claim 8, wherein:

the scale comprises a transparent substrate, the two-dimensional integrated scale pattern provided on a surface of the substrate that is farthest from the readhead; and the at least one diffusely reflecting surface comprises at least one portion of at least one diffuse backing provided on or over the two-dimensional integrated scale pattern on the surface that is farthest from the readhead.

10. The absolute position sensing device of claim 1, wherein a first part of the number of code elements sufficient to define the defined at least one code word are included in a first one of a plurality of code portions included at least partly in the detection window and a second part of the number of code elements sufficient to define the defined at least one code word are included in a second one of the plurality of code portions included at least partly in the detection window.

11. The absolute position sensing device of claim 1, wherein the detection window of the readhead includes at least one complete code portion which includes the number of code elements sufficient to define the defined at least one code word, regardless of the position of the detection window within the two-dimensional integrated scale pattern.

12. The absolute position sensing device of claim 1, wherein:

the readhead comprises a light source and a two-dimensional detector array usable to detect an image of the scale coextensive with the detection window; and the pluralities of code elements are arranged along the integrated scale pattern such that, when the readhead is operably positioned relative to the scale, the detected image of the scale includes a feature usable as the local datum point, regardless of the readhead position along the two-dimensional integrated scale pattern.

13. The absolute position sensing device of claim 12, wherein the detected image is usable to determine a measurement value of an offset of the readhead relative to the local datum point along each of two directions corresponding to the first and second measuring axes, respectively.

14. The absolute position sensing device of claim 1, wherein each at least one code word is directly usable to determine a measurement value of a local datum along each of the first and second measuring axes without reference to a lookup table.

15. The absolute position sensing device of claim 1, further comprising a signal processing unit, wherein, when an operably positioned readhead detects an image of the scale, the signal processing unit is usable to determine a first resolution absolute measurement value of a local datum along each of the first and second measuring axes based on the sufficient number of code elements included in the detected image.

16. The absolute position sensing device of claim 15, wherein the signal processing unit is further usable to determine a measurement value of an offset of the readhead relative to the local datum along each of two directions corresponding to the first and second measuring axes based on at least one of a) the location of the local datum in the detected image, and b) the location of the at least a portion of at least one quasi-random pattern in the detected image, the measurement value of the offset of the readhead relative to the local datum point having a measurement resolution finer than the first resolution absolute measurement value along each of the first and second measuring axes.

17. The absolute position sensing device of claim 16, wherein the signal processing unit is further usable to combine the first resolution absolute measurement value of the local datum point along the first measuring axis and the measurement value of the offset of the readhead relative to the local datum point along the first measuring axis to determine an absolute position measurement along the first measuring axis with a measurement resolution finer than the first resolution absolute position measurement.

18. The absolute position sensing device of claim 17, wherein the signal processing unit is further usable to combine the first resolution absolute measurement value of the local datum point along the second measuring axis and the measurement value of the offset of the readhead relative to the local datum point along the second measuring axis to determine an absolute position measurement along the second measuring axis with a measurement resolution finer than the first resolution absolute position measurement.

19. The absolute position sensing device of claim 16, wherein the signal processing unit comprises a memory portion including data usable to form at least one reference image representation such that at least one reference image representation is correlatable with the at least a portion of at least one quasi-random pattern in the detected image in order to determine the measurement value of an offset of the readhead relative to the local datum along each of two directions corresponding to the first and second measuring axes.

20. The absolute position sensing device of claim 1, wherein the at least a portion of at least one quasi-random pattern includes at least a portion based on a real random pattern.

21. The absolute position sensing device of claim 20, wherein the real random pattern comprises a speckle pattern.

22. The absolute position sensing device of claim 1, wherein the at least a portion of at least one quasi-random pattern includes at least a portion based on a synthetically-generated random pattern.

23. The absolute position sensing device of claim 1, wherein the plurality of code portions comprise a relatively narrow configuration of code elements that extend along at least one of the first and second directions, the relatively narrower configuration having a relatively longer dimension and a relatively narrower dimension wherein the relatively longer dimension is at least 8 times the relatively narrower dimension.

24. The absolute position sensing device of claim 23, wherein along at least one direction the relatively longer dimension extends completely across the corresponding quasi-random pattern portion.

25. A method for determining a high resolution absolute position of a two-dimensional detector array along a two-dimensional absolute scale, wherein the two-dimensional absolute scale includes a two-dimensional integrated scale pattern extending along first and second measuring axes, the two-dimensional integrated scale pattern comprising:

a plurality of quasi-random pattern portions, each quasi-random pattern extending along the first and second measuring axes and having first and second dimensions, and each quasi-random pattern portion comprising at least a portion of at least one quasi-random pattern; and a plurality of code groups distributed within the two-dimensional integrated scale pattern and spaced apart along a first direction by substantially the first dimension and spaced apart along a second direction by substantially the second dimension, each code group comprising a plurality of code elements defining at least one code word, the at least one code word usable to identify a measurement value of a local datum along each of the first and second measuring axes;

the method comprising:

detecting an image of a portion of the two-dimensional integrated scale pattern corresponding to a current position using the detector array;

determining an absolute measurement value of a local datum along each of the first and second measuring axes based on at least one code group included in the detected image;

determining a measurement value of an offset of the detector array relative to the local datum along each of the first and second measuring axes based on at least one of a) the location of the local datum in the detected image, and b) the location of the at least a portion of at least one quasi-random pattern in the detected image; and combining the absolute measurement value of the local datum along each of the first and second measuring axes and the measurement value of the offset of the detector array relative to the local datum along each of the first and second measuring axes to determine a high resolution absolute position of the detector array along the first and second measuring axes of the two-dimensional absolute scale.

26. The method of claim 25, wherein:

each code group includes a predetermined portion; and determining the absolute measurement value of the local datum along each of the first and second measuring axes based on at least one code group comprises:

determining a location of the predetermined portion included in at least one of the at least one code group, determining a location of the code elements in the detected image based on the determined location of the predetermined portion, and processing the detected image corresponding to the location of the code elements to determine code element values of the code elements appearing in the detected image; and determining the measurement value of the local datum comprises determining the measurement value of the local datum along each of the first and second measuring axes based on the determined code element values.

27. The method of claim 25, wherein:

the detector array comprises a plurality of detector elements extending in at least one row along a direction corresponding to the first measuring axis direction, the detector elements spaced apart along the at least one row according to a detector element first pitch;

the detector array comprises a plurality of detector elements extending in at least one column along a direction corresponding to the second measuring axis direction, the detector elements spaced apart along the at least one column according to a detector element second pitch; and determining the measurement value of the offset of the detector array relative to the local datum along each of the first and second measuring axes comprises:

estimating an offset of a local datum characteristic relative to the detector array along the first measuring axis direction, estimating an offset of at least a portion of at least one quasi-random pattern in the detected image relative to the detector array along the first measuring axis direction to a resolution that is at least as fine in the detected image as the detector element first pitch, estimating an offset of a local datum characteristic relative to the detector array along the second measuring axis direction, estimating an offset of at least a portion of at least one quasi-random pattern in the detected image relative to the detector array along the second measuring axis direction to a resolution that is at least as fine in the detected image as the detector element second pitch, determining the measurement value of the offset of the detector array relative to the local datum along the first measuring axis based at least on the estimate of the offset of the at least a portion of at least one quasi-random pattern relative to the detector array along the first measuring axis, and determining the measurement value of the offset of the detector array relative to the local datum along the second measuring axis based at least on the estimate of the offset of the at least a portion of at least one quasi-random pattern relative to the detector array along the second measuring axis.

* * * * *